United States Patent
Ono

(10) Patent No.: US 10,638,056 B2
(45) Date of Patent: Apr. 28, 2020

(54) IMAGING DEVICE, IMAGING METHOD, PROGRAM, AND NON-TRANSITORY RECORDING MEDIUM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 16/186,604

(22) Filed: Nov. 12, 2018

(65) Prior Publication Data

US 2019/0082093 A1   Mar. 14, 2019

Related U.S. Application Data

(63) Continuation of application No. PCT/JP2017/009862, filed on Mar. 13, 2017.

(30) Foreign Application Priority Data

May 17, 2016 (JP) ................................. 2016-098913

(51) Int. Cl.
*H04N 5/235* (2006.01)
*G02B 13/04* (2006.01)
(Continued)

(52) U.S. Cl.
CPC .......... *H04N 5/2355* (2013.01); *G02B 13/02* (2013.01); *G02B 13/04* (2013.01); *G02B 17/08* (2013.01);
(Continued)

(58) Field of Classification Search
CPC .. H04N 5/2355; H04N 5/2353; H04N 5/2254; H04N 5/23238; H04N 5/238;
(Continued)

(56) References Cited

U.S. PATENT DOCUMENTS

2006/0278896 A1* 12/2006 Inoue ................ H01L 27/14612
257/215
2010/0187401 A1* 7/2010 Kawahito ......... H01L 27/14609
250/208.1
(Continued)

FOREIGN PATENT DOCUMENTS

JP   2015201834   11/2015
WO   2013024636   2/2013
(Continued)

OTHER PUBLICATIONS

"International Search Report (Form PCT/ISA/210) of PCT/JP2017/009862," dated May 23, 2017, with English translation thereof, pp. 1-5.
(Continued)

*Primary Examiner* — Yogesh K Aggarwal
(74) *Attorney, Agent, or Firm* — JCIPRNET

(57) ABSTRACT

Provided are an imaging device, method, and a non-transitory recording medium, which simultaneously image a plurality of images and obtain images having enlarged dynamic ranges by using an imaging system, comprising a directional sensor in which light receiving sensors have directivity with respect to incidence angles of light rays. Image signals of first and second light receiving sensors are obtained in a state in which second incidence rays of an imaging lens are shielded from a directional sensor in which a ratio of sensitivity between the first and the second light receiving sensors with respect to first incidence rays incident through a first optical system of the imaging lens is M:1, and a third image having a dynamic range which is equal to or less than M times a dynamic range of a first image using the image signals of the first light receiving sensors is generated.

20 Claims, 17 Drawing Sheets

(51) Int. Cl.
*G03B 7/28* (2006.01)
*H04N 5/225* (2006.01)
*G02B 17/08* (2006.01)
*G03B 5/00* (2006.01)
*H04N 5/232* (2006.01)
*H04N 5/238* (2006.01)
*G02B 13/02* (2006.01)
*G02F 1/137* (2006.01)
*G03B 9/00* (2006.01)
*G02B 27/10* (2006.01)
*G03B 17/17* (2006.01)
*G02F 1/133* (2006.01)

(52) U.S. Cl.
CPC ..... *G02B 17/0808* (2013.01); *G02B 17/0896* (2013.01); *G02F 1/137* (2013.01); *G03B 5/00* (2013.01); *G03B 7/28* (2013.01); *G03B 9/00* (2013.01); *H04N 5/2254* (2013.01); *H04N 5/238* (2013.01); *H04N 5/2353* (2013.01); *H04N 5/23238* (2013.01); *G02B 27/1066* (2013.01); *G02F 1/13306* (2013.01); *G03B 17/17* (2013.01)

(58) Field of Classification Search
CPC ... G03B 7/28; G03B 5/00; G03B 9/00; G03B 17/17; G02B 17/0896; G02B 17/0808; G02B 13/02; G02B 13/04; G02B 17/08; G02B 27/1066; G02F 1/13306; G02F 1/137

USPC ........ 348/294–324; 250/208.1; 257/290–292
See application file for complete search history.

(56) References Cited

U.S. PATENT DOCUMENTS

| | | | |
|---|---|---|---|
| 2013/0193311 A1* | 8/2013 | Yoshida | ................ H04N 9/045 250/208.1 |
| 2014/0152779 A1 | 6/2014 | Ono | |
| 2014/0168498 A1 | 6/2014 | Ono | |
| 2015/0009369 A1 | 1/2015 | Ono | |
| 2015/0236066 A1* | 8/2015 | Tayanaka | .......... H01L 27/14627 257/432 |
| 2017/0104942 A1 | 4/2017 | Hirota et al. | |
| 2017/0118398 A1* | 4/2017 | Sano | ........................ G02B 7/34 |

FOREIGN PATENT DOCUMENTS

| | | |
|---|---|---|
| WO | 2013027488 | 2/2013 |
| WO | 2013146506 | 10/2013 |

OTHER PUBLICATIONS

"Written Opinion of the International Searching Authority (Form PCT/ISA/237) of PCT/ JP2017/009862," dated May 23, 2017, with English translation thereof, pp. 1-7.

* cited by examiner

IMAGING DEVICE, IMAGING METHOD, PROGRAM, AND NON-TRANSITORY RECORDING MEDIUM

CROSS-REFERENCE TO RELATED APPLICATIONS

This application is a Continuation of PCT International Application No. PCT/JP2017/009862 filed on Mar. 13, 2017, which claims priority under 35 U.S.C § 119(a) to Patent Application No. 2016-098913 filed in Japan on May 17, 2016, all of which are hereby expressly incorporated by reference into the present application.

BACKGROUND OF THE INVENTION

1. Field of the Invention

The present invention relates to an imaging device, an imaging method, a program, and a non-transitory recording medium, and particularly, to a technology that simultaneously images a plurality of images by using a directional sensor in which light receiving sensors have directivity with respect to incidence angles of light rays.

2. Description of the Related Art

An imaging system capable of simultaneously obtaining a plurality of images having different imaging characteristics by using an imaging system comprising an optical system having imaging characteristics different depending on regions and a directional sensor has been suggested. The directional sensor is ideally manufactured so as to sense only light rays from an assumed pupil region. However, interference is caused in reality, and thus, the directional sensor may sense light rays even from another pupil region since.

With respect to such a problem, WO2013/146506A describes a technology that generates an image corresponding to one region of a plurality of regions from imaging signals of light receiving sensors corresponding to the one region, and removes the influence of luminous flux passed through regions other than the one region from the image generated so as to correspond to the one region at the time of correcting the generated image.

SUMMARY OF THE INVENTION

However, the technology described in WO2013/146506A has a problem that it is not possible to remove interference components due to the influence of signal saturation in a case where there is a subject having a high brightness and the image quality of an output image deteriorates. In order to obtain images having enlarged dynamic ranges so as not to cause overexposure in the subject having the high brightness, it is necessary to image two images having different exposure times.

The present invention has been made in view of such circumstances, and an object of the present invention is to provide an imaging device, an imaging method, a program, and a non-transitory recording medium, which simultaneously image a plurality of images and obtain images having enlarged dynamic ranges by using an imaging system comprising a directional sensor in which light receiving sensors have directivity with respect to incidence angles of light rays.

In order to achieve the aforementioned object, an aspect of an imaging device comprises an imaging lens that comprises a first optical system and a second optical system which are respectively provided in different regions, a directional sensor in which a plurality of first light receiving sensors and a plurality of second light receiving sensors are arranged in a two-dimensional shape, a ratio of sensitivity between the first light receiving sensors and the second light receiving sensors with respect to first incidence rays incident through the first optical system being M:1 and a ratio of sensitivity between the first light receiving sensors and the second light receiving sensors with respect to second incidence rays incident through the second optical system being 1:N in a case where M and N are values greater than 1, an image reading-out unit that obtains first image signals obtained from the plurality of first light receiving sensors and second image signals obtained from the plurality of second light receiving sensors, an image generating unit that generates a first image from the first image signals and generates a second image from the second image signals, a first light shielding controller that controls entering or shielding of the second incidence rays for the directional sensor, and a dynamic range enlarging unit that obtains the first image signals and the second image signals in a state in which the second incidence rays are shielded, and generates a third image having a dynamic range which is equal to or less than M times a dynamic range of the first image.

According to the present aspect, since the first image signals and the second image signals are obtained from the plurality of first light receiving sensors and the plurality of second light receiving sensors in a state in which the second incidence rays are shielded by using the directional sensor in which the ratio of sensitivity between the first light receiving sensors and the second light receiving sensors with respect to the first incidence rays incident through the first optical system is M:1 and the third image having the dynamic range which is equal to or less than M times the dynamic range of the first image generated from the first image signals is generated, it is possible to image the images having the enlarged dynamic ranges by using the imaging system comprising the directional sensor in which the light receiving sensors have directivity with respect to the incidence angles of the light rays.

It is preferable that the first light shielding controller comprises a first shutter that switches between a transmission state and a shielding state of light rays. Accordingly, it is possible to appropriately control the entering or shielding of the second incidence rays for the directional sensor.

It is preferable that the first shutter is disposed at an optical path of the second incidence rays. Accordingly, it is possible to appropriately control the entering or shielding of the second incidence rays for the directional sensor.

It is preferable that the imaging device further comprises a second light shielding controller that controls entering or shielding of the first incidence rays for the directional sensor and the dynamic range enlarging unit obtains the first image signals and the second image signals in a state in which the second incidence rays are incident and the first incidence rays are shielded, and generates a fourth image having a dynamic range which is N times a dynamic range of the second image. Accordingly, it is possible to image the images having the enlarged dynamic ranges using the second incidence rays.

It is preferable that the second light shielding controller comprises a second shutter that switches between a transmission state and a shielding state of light rays. Accordingly, it is possible to appropriately control the entering or shielding of the first incidence rays for the directional sensor.

It is preferable that the second shutter is disposed at an optical path of the first incidence rays. Accordingly, it is possible to appropriately control the entering or shielding of the first incidence rays for the directional sensor.

It is preferable that the first optical system and the second optical system have imaging characteristics different from each other. Accordingly, it is possible to simultaneously image the images having the imaging characteristics different from each other.

It is preferable that one of the first optical system and the second optical system is a wide angle optical system, and the other one is a telephoto optical system of which a focal length is greater than a focal length of the wide angle optical system. Accordingly, it is possible to simultaneously image the wide angle image and the telephoto image.

It is preferable that the imaging lens is configured such that the first optical system is disposed in a central part and the second optical system is disposed at an edge part of the first optical system in a ring shape. Accordingly, it is possible to appropriately arrange the first optical system and the second optical system, and it is possible to appropriately control the entering or shielding of the second incidence rays for the directional sensor.

The imaging device further may comprise a stop that adjusts the amount of light rays incident on the directional sensor. The first light shielding controller may control the entering or shielding of the second incidence rays for the directional sensor by the stop. Accordingly, it is possible to appropriately control the entering or shielding of the second incidence rays for the directional sensor.

In order to achieve the aforementioned object, an aspect of an imaging method is an imaging method of an imaging device which comprises an imaging lens that comprises a first optical system and a second optical system provided in different regions, and a directional sensor in which a plurality of first light receiving sensors and a plurality of second light receiving sensors are arranged in a two-dimensional shape, a ratio of sensitivity between the first light receiving sensors and the second light receiving sensors with respect to first incidence rays incident through the first optical system being M:1 and a ratio of sensitivity between the first light receiving sensors and the second light receiving sensors with respect to second incidence rays incident through the second optical system being 1:N in a case where M and N are values greater than 1. The method comprises an image reading-out step of obtaining first image signals obtained from the plurality of first light receiving sensors and second image signals obtained from the plurality of second light receiving sensors, an image generating step of generating a first image from the first image signals and generating a second image from the second image signals, a first light shielding control step of controlling entering or shielding of the second incidence rays for the directional sensor, and a dynamic range enlarging step of obtaining the first image signals and the second image signals in a state in which the second incidence rays are shielded, and generating a third image having a dynamic range which is equal to or less than M times a dynamic range of the first image.

According to the present aspect, since the first image signals and the second image signals are obtained from the plurality of first light receiving sensors and the plurality of second light receiving sensors in a state in which the second incidence rays are shielded by using the directional sensor in which the ratio of sensitivity between the first light receiving sensors and the second light receiving sensors with respect to the first incidence rays incident through the first optical system is M:1 and the third image having the dynamic range which is equal to or less than M times the dynamic range of the first image generated from the first image signals is generated, it is possible to image the images having the enlarged dynamic ranges by using the imaging system comprising the directional sensor in which the light receiving sensors have directivity with respect to the incidence angles of the light rays.

A program causing the imaging device to perform the imaging method is also included in the present aspect. A non-transitory recording medium having computer-readable codes of the program recorded thereon is also included in the present aspect.

According to the present invention, it is possible to image the images having the enlarged dynamic ranges by using the imaging system comprising the directional sensor in which the light receiving sensors have directivity with respect to the incidence angles of the light rays.

DESCRIPTION OF THE PREFERRED EMBODIMENTS

Hereinafter, preferred embodiments of the present invention will be described with reference to the accompanying drawings.

[Configuration of Digital Camera]

Figure 1:
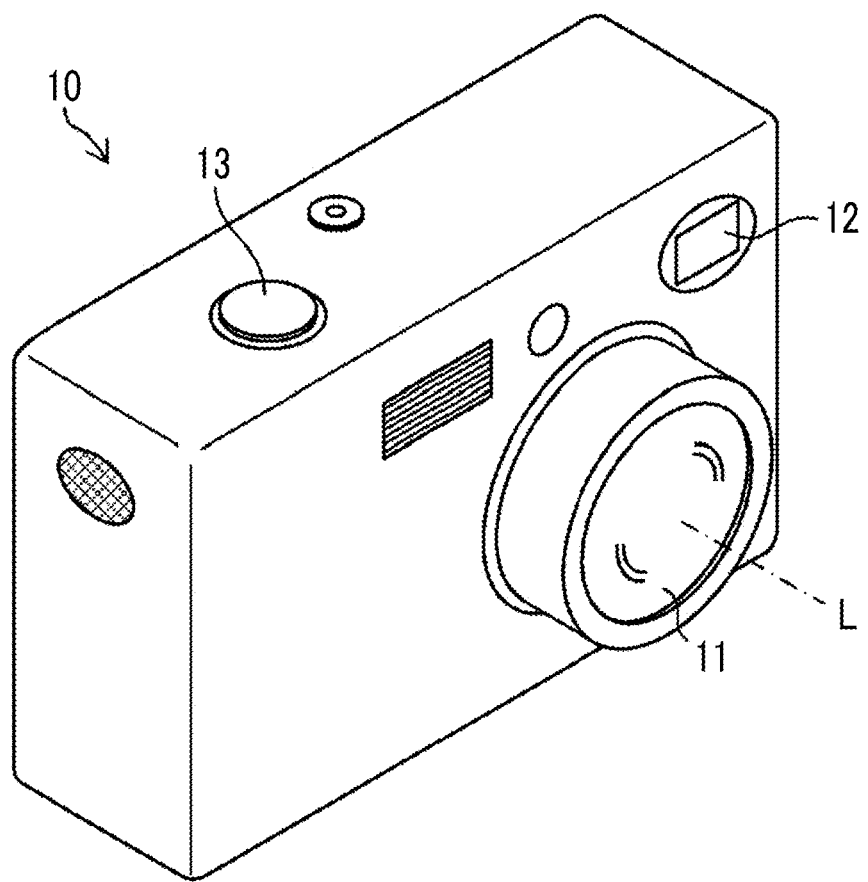
FIG. 1 is a perspective view showing a digital camera.

FIG. 1 is a perspective view showing a digital camera 10 (an example of an imaging device) according to the present embodiment. The digital camera 10 is configured such that a multiple-property lens 11 having an optical axis L and a flash light emitting unit 12 that irradiates a subject with imaging auxiliary light rays are provided on a front surface of a main body and a release button 13 for performing an imaging operation are provided on an upper surface of the main body.

In order for a photographer to image the subject by using the digital camera 10, the photographer may direct the multiple-property lens 11 to the subject and may press the release button 13 while holding the digital camera 10. A subject image formed on a light receiving surface of a pupil selection sensor 24 (see FIG. 2) through the multiple-property lens 11 is photoelectrically converted by the pupil selection sensor 24, and is read as image signals based on a manipulation of the release button 13. Image processing is performed on the image signals, and thus, a captured image of the subject can be obtained.

[Configuration of Imaging Unit]

Figure 2:
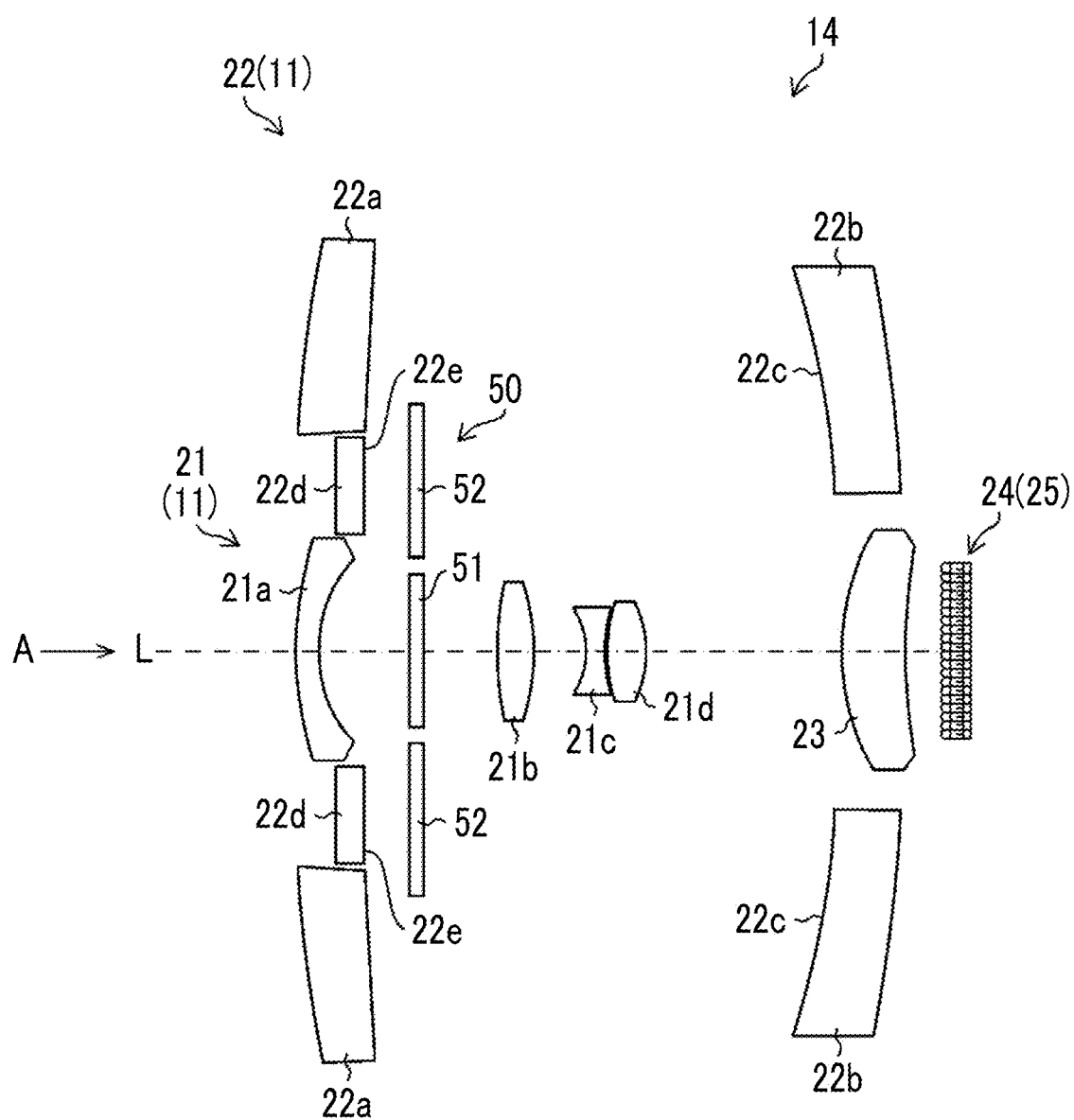
FIG. 2 is a diagram showing a cross-sectional configuration of an imaging unit.

FIG. 2 is a diagram showing a cross-sectional configuration of an imaging unit 14 that comprises the multiple-property lens 11 and the pupil selection sensor 24.

The multiple-property lens 11 (an example of an imaging lens) includes a first optical system 21 and a second optical system 22 of which imaging characteristics are independent of each other, and particularly, the first optical system 21 and the second optical system 22 are constituted by optical systems of which focal lengths are different from each other in the present embodiment. That is, the multiple-property lens 11 according to the present embodiment includes the first optical system 21 (one is an example of a wide angle optical system) composed of a wide angle image imaging lens group and the second optical system 22 (the other one is an example of a telephoto optical system) composed of a telephoto image imaging lens group.

The first optical system 21 shown in FIG. 2 includes a first wide angle lens 21a, a second wide angle lens 21b, a third wide angle lens 21c, a fourth wide angle lens 21d, and a common lens 23 which are arranged on the same optical axis L. Meanwhile, the second optical system 22 includes a first telephoto lens 22a, a first telephoto reflector 22b provided with a first telephoto reflection mirror 22c, a second telephoto reflector 22d provided with a second telephoto reflection mirror 22e, and the common lens 23.

Figure 3:
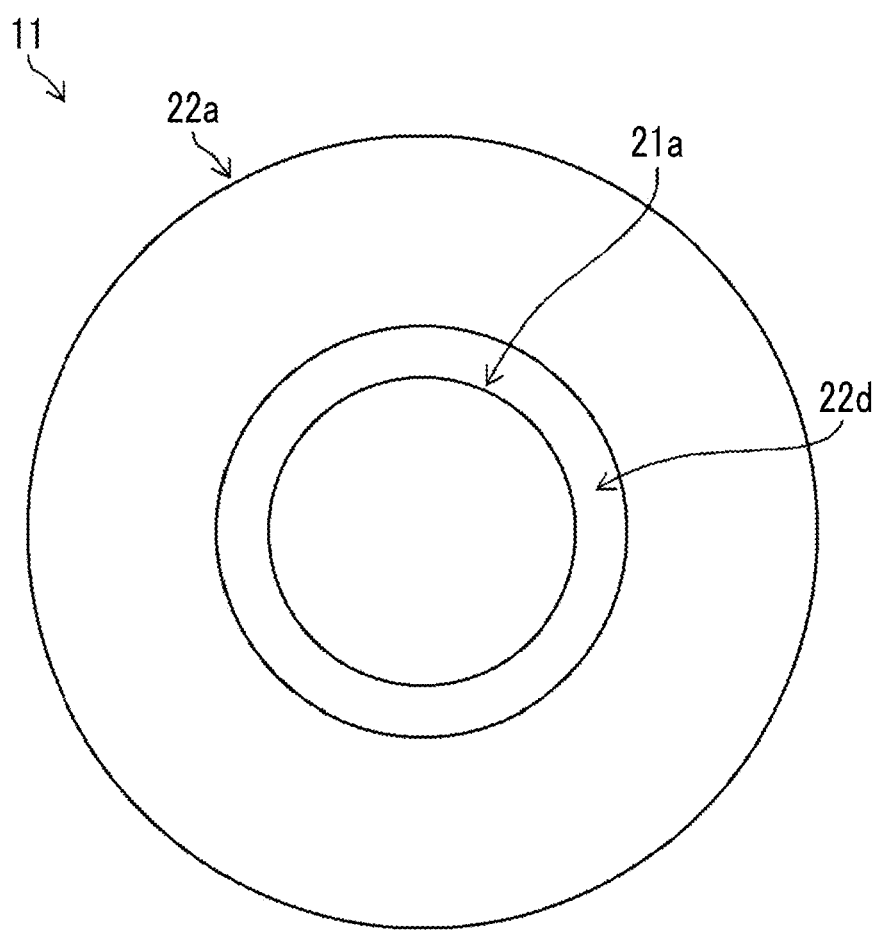
FIG. 3 is a view taken along an arrow A of FIG. 2.

FIG. 3 is a view taken along an arrow A of FIG. 2. The first optical system 21 (particularly, the first wide angle lens 21a, the second wide angle lens 21b, the third wide angle lens 21c, and the fourth wide angle lens 21d) and the second optical system 22 (particularly, the first telephoto lens 22a, the first telephoto reflector 22b, the first telephoto reflection mirror 22c, the second telephoto reflector 22d, and the second telephoto reflection mirror 22e) are concentrically arranged. The first optical system 21 forms a central optical system, and the second optical system 22 forms a peripheral optical system disposed at an edge part of the first optical system 21 in a ring shape. The common lens 23 is disposed on the optical axis L, and is commonly used between the first optical system 21 and the second optical system 22.

As stated above, the multiple-property lens 11 includes the first optical system 21 and the second optical system 22 which have the common optical axis L, and the first optical system 21 and the second optical system 22 have focal lengths and imaging angles of view are different from each other.

Referring back to FIG. 2, the pupil selection sensor 24 is a directional sensor configured such that a plurality of light receiving sensors 25 (photoelectric conversion elements) has directivity with respect to incidence angles of light rays. The plurality of light receiving sensors 25 is arranged in a two-dimensional shape in a direction perpendicular to the optical axis L, and simultaneously receives wide angle image light rays W (an example of first incidence rays, see FIG. 5) incident on the first optical system 21 and telephoto image light rays T (an example of second incidence rays, see FIG. 6) incident on the second optical system 22.

Figure 4:
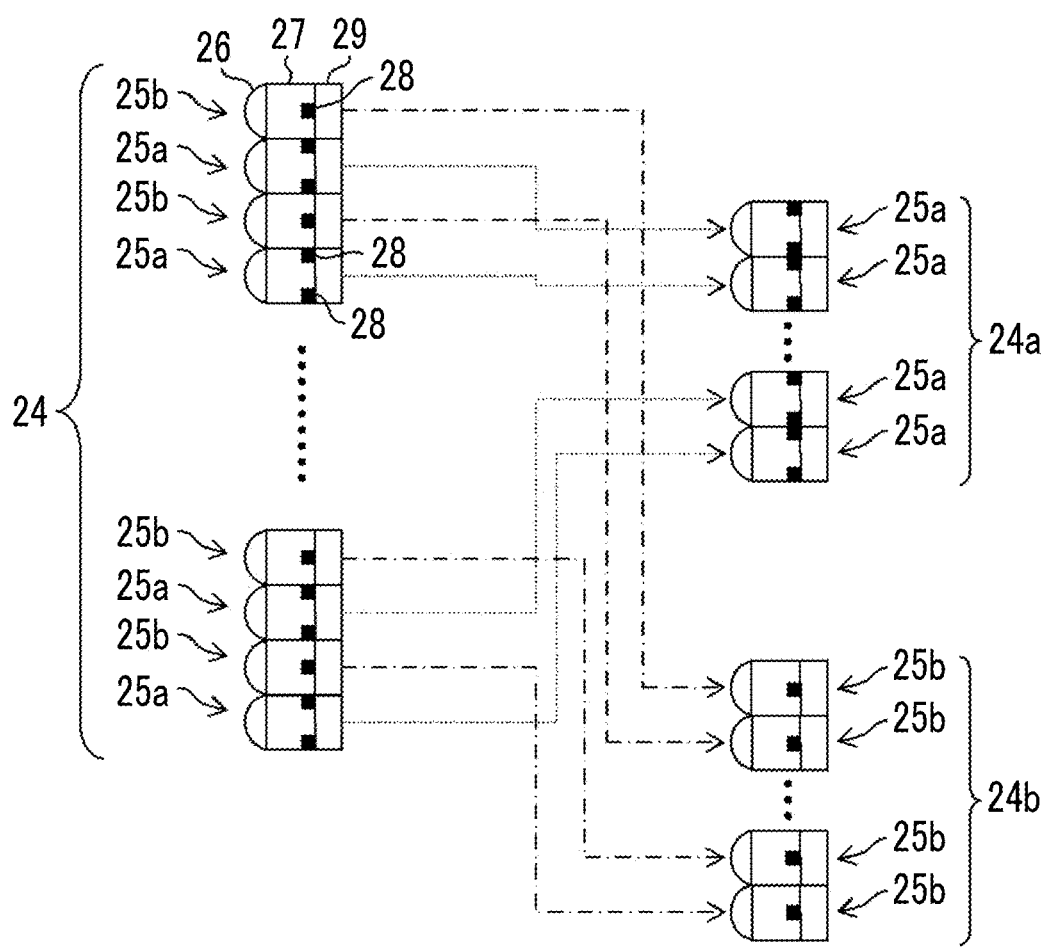
FIG. 4 is a diagram showing a detailed cross-sectional configuration example of a pupil selection sensor.

FIG. 4 is a diagram showing a detailed cross-sectional configuration example of the pupil selection sensor 24. The pupil selection sensor 24 comprises first light receiving sensors 25a and second light receiving sensors 25b of which angle sensitivity characteristics are different, and the first light receiving sensors 25a and the second light receiving sensors 25b are alternately arranged.

The first light receiving sensors 25a receive the wide angle image light rays W, and output first image signals for generating a wide angle image (an example of a first image). The second light receiving sensors 25b receive the telephoto image light rays T, and output second image signals for generating a telephoto image (an example of a second image).

The plurality of first light receiving sensors 25a composes a first sensor group 24a that selectively receives the wide angle image light rays W, and the plurality of second light receiving sensors 25b composes a second sensor group 24b that selectively receives the telephoto image light rays T.

Each of the first light receiving sensor 25a and the second light receiving sensor 25b has a microlens 26, a photodiode 29, and an interlayer 27 on which the microlens 26 and the photodiode 29 are arranged. A light shielding mask 28 is provided on the interlayer 27. The light shielding mask 28 is disposed at an edge part of a light receiving surface of the photodiode 29 in the first light receiving sensor 25a, and the light shielding mask 28 is disposed at a central part of the light receiving surface of the photodiode 29 in the second light receiving sensor 25b. The arrangement of the light shielding masks 28 is determined depending on whether the light shielding mask is disposed at the first optical system 21 or the second optical system 22, and each light shielding mask 28 shields the light from the non-corresponding optical system and enables the photodiode 29 to receive the light from the corresponding optical system without shielding the light from the corresponding optical system.

In reality, in the pupil selection sensor 24 having the aforementioned configuration, the telephoto image light rays T interfere with the first light receiving sensors 25a that selectively receive the wide angle image light rays W, and the wide angle image light rays W interfere with the second light receiving sensors 25b that selectively receive the telephoto image light rays T. In the present embodiment, in a case where M and N are values which are larger than 1, it is assumed that a ratio of sensitivity (interference) between the first light receiving sensors 25a and the second light receiving sensors 25b with respect to the wide angle image light rays W is M:1 and a ratio of sensitivity between the first light receiving sensors 25*a* and the second light receiving sensors 25*b* with respect to the telephoto image light rays T is 1:N. For example, the relationship of M=10 and N=10 may be satisfied. M and N may be different values.

Although the plurality of light receiving sensors that divides the light rays passed through the corresponding optical system of the first optical system 21 and the second optical system 22 through pupil division, and selectively receives the divided light rays by using the light receiving sensors 25 including the light shielding masks 28 is realized in this example, the pupil division may be realized by another means. The light shielding mask 28 may be provided on an upstream side of an optical path of incidence rays from the microlens 26, for example, a region between the common lens 23 (see FIG. 2) and the microlens 26. Light shielding means other than the light shielding mask 28 such as a liquid crystal shutter may be used.

For example, a member other than the light shielding mask 28 may be provided on the interlayer 27 or a wiring and/or a circuit may be provided on the interlayer 27.

A color filter array constituted by R (red), G (green), and B (blue) color filters (optical filters) provided so as to correspond to the first light receiving sensors 25*a* and the second light receiving sensors 25*b* is provided in the pupil selection sensor 24, and a digital image signal processing unit 34 (see FIG. 13) performs a demosaicing process on colors images (mosaic images) obtained so as to correspond to a color array pattern of the color filter array. Accordingly, a color wide angle image and a color telephoto image are obtained.

Referring back to FIG. 2, the imaging unit 14 comprises a light shielding unit 50 including a first liquid crystal shutter 51 (an example of a second shutter) and a second liquid crystal shutter 52 (an example of a first shutter). The first liquid crystal shutter 51 and the second liquid crystal shutter 52 are respectively liquid crystal panels which are concentrically arranged in the direction perpendicular to the optical axis L. The first liquid crystal shutter 51 and the second liquid crystal shutter 52 can switch between a transmission state in which incident light rays are transmitted and a shielding state in which light rays are shielded, and this switching is controlled by a light shielding shutter controller 48 (see FIG. 15).

The first liquid crystal shutter 51 has a circular shape corresponding to the first optical system 21, and is disposed in a position on an optical path of the wide angle image light rays W, that is, a position between the first wide angle lens 21*a* and the second wide angle lens 21*b*. That is, the first liquid crystal shutter 51 controls the passing and shielding of the wide angle image light rays W by the transmission state and the shielding state. The first liquid crystal shutter 51 is not limited to be disposed within the first optical system 21, and may be disposed ahead of the first optical system 21 on the optical path of the wide angle image light rays W or may be disposed behind the first optical system 21 (between the first optical system 21 and the pupil selection sensor 24).

The second liquid crystal shutter 52 is disposed at an edge part of the first liquid crystal shutter 51 in a ring shape so as to correspond to the second optical system 22, and is disposed in a position of an optical path of the telephoto image light rays T, that is, a position between the first telephoto reflection mirror 22*c* and the second telephoto reflection mirror 22*e*. That is, the second liquid crystal shutter 52 controls the passing and shielding of the telephoto image light rays T by the transmission state and the shielding state. The second liquid crystal shutter 52 is also not limited to be disposed within the second optical system 22, and may be disposed ahead of the second optical system 22 on the optical path of the telephoto image light rays T or may be disposed behind the second optical system 22 (between the second optical system 22 and the pupil selection sensor 24).

The light shielding unit 50 may be constituted by forming the first liquid crystal shutter 51 and the second liquid crystal shutter 52 as one liquid crystal panel, and may individually switch between the transmission state and the shielding state for each region.

[Actions of Imaging Unit]

<Case where First Liquid Crystal Shutter and Second Liquid Crystal Shutter are in Transmission State>

Figure 5:
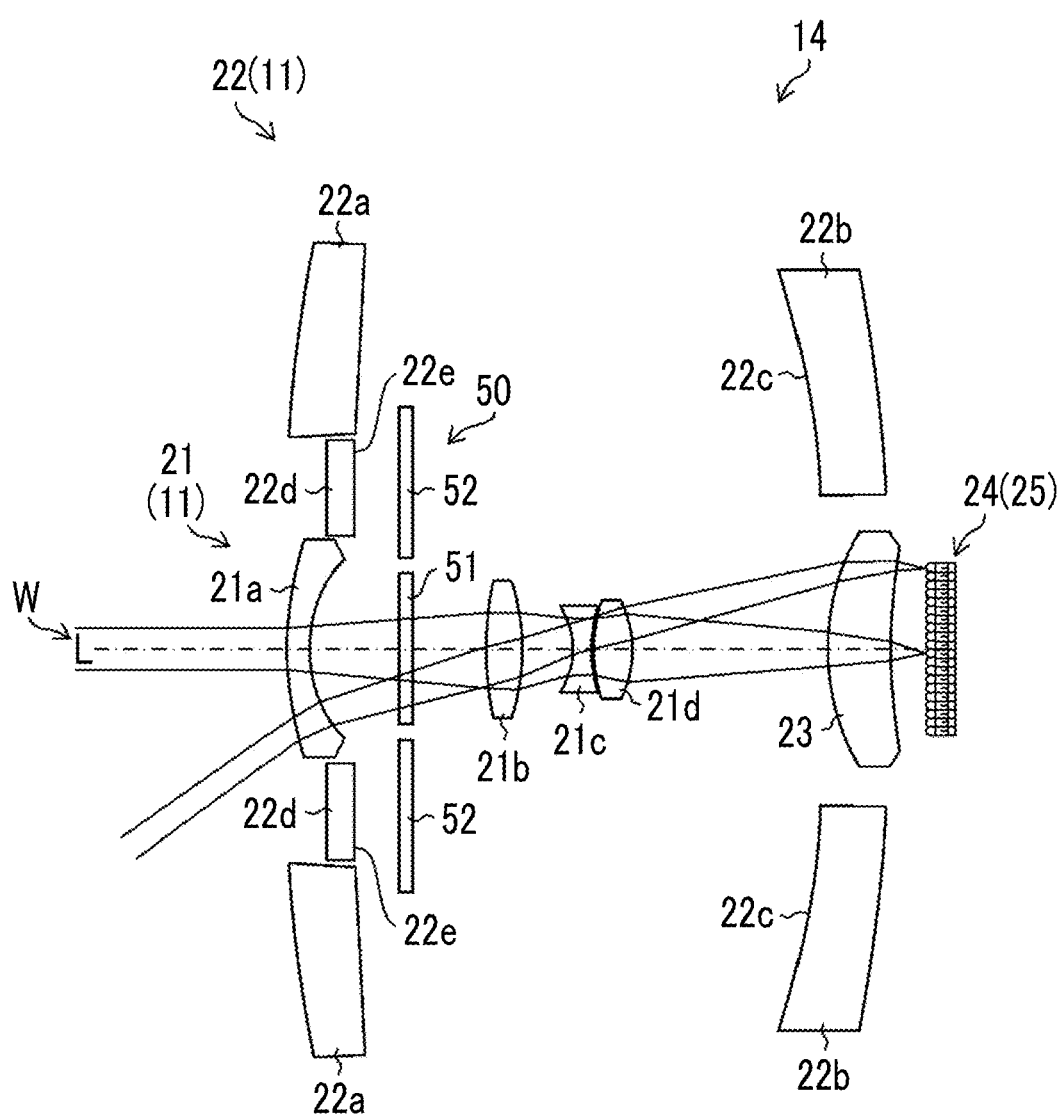
FIG. 5 is a diagram showing an optical path of wide angle image light rays incident on a multiple-property lens.

FIG. 5 is a diagram showing the optical path of the wide angle image light rays W incident on the multiple-property lens 11 (particularly, the first optical system 21) and the pupil selection sensor 24 (particularly, the first sensor group 24*a* (see FIG. 4)) shown in FIG. 2, and shows a case where the first liquid crystal shutter 51 is in the transmission state. As shown in this diagram, the wide angle image light rays W pass through the first wide angle lens 21*a*, the first liquid crystal shutter 51, the second wide angle lens 21*b*, the third wide angle lens 21*c*, the fourth wide angle lens 21*d*, and the common lens 23 of the first optical system 21 in order, and the wide angle image is formed on the first light receiving sensors 25*a* of the pupil selection sensor 24.

Figure 6:
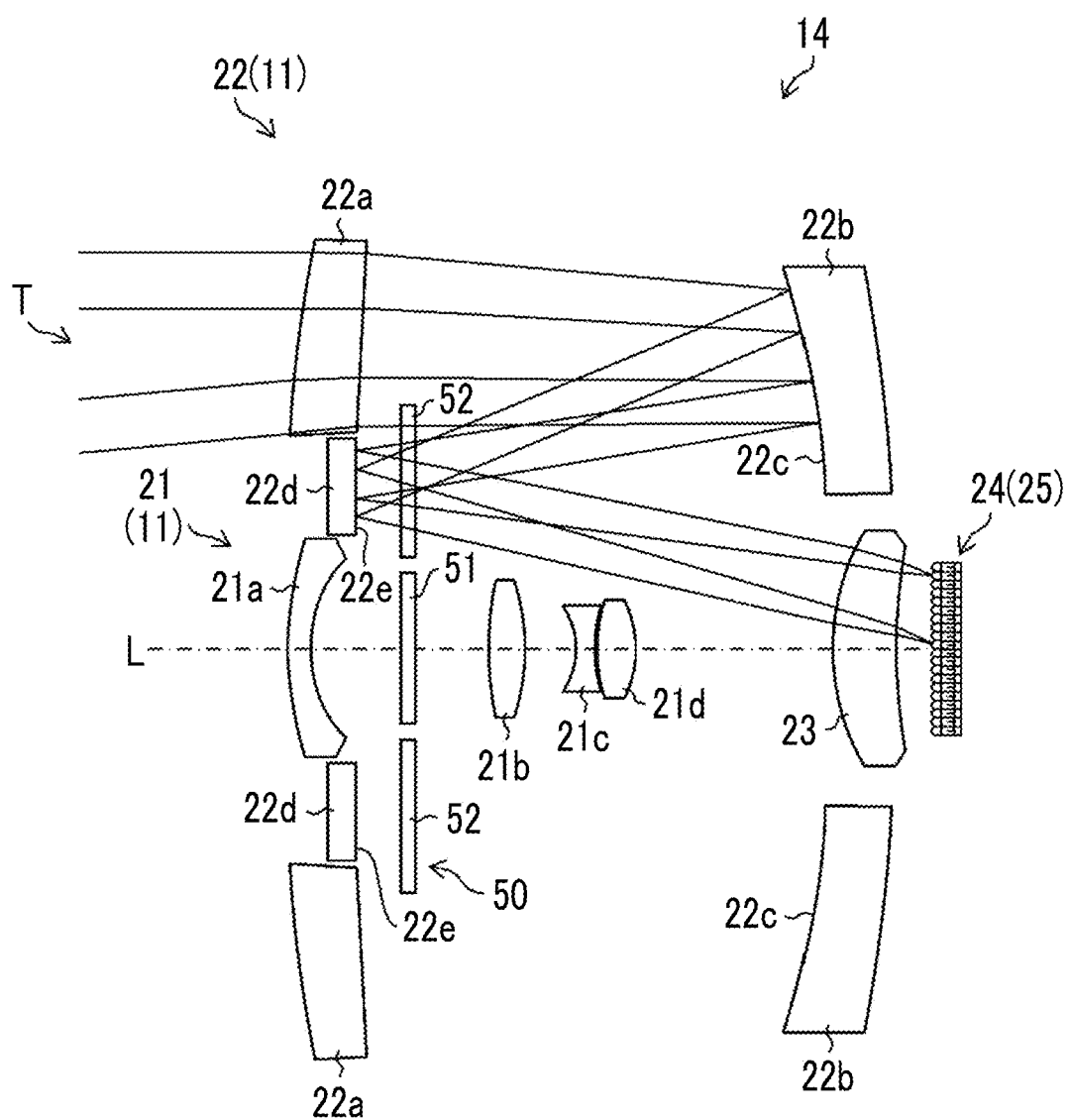
FIG. 6 is a diagram showing an optical path of telephoto image light rays incident on the multiple-property lens.

FIG. 6 is a diagram showing the optical path of the telephoto image light rays T incident on the multiple-property lens 11 (particularly, the second optical system 22) and the pupil selection sensor 24 (particularly, the second sensor group 24*b* (see FIG. 4)) shown in FIG. 2, and shows a case where the second liquid crystal shutter 52 is in the transmission state. As shown in this diagram, the telephoto image light rays T pass (transmit) through the first telephoto lens 22*a*, are reflected from the first telephoto reflection mirror 22*c*. Subsequently, the telephoto image light rays pass through the second liquid crystal shutter 52, and are reflected from the second telephoto reflection mirror 22*e*. Thereafter, the telephoto image light rays pass through the second liquid crystal shutter 52 and the common lens 23, and the telephoto image is formed on the second light receiving sensors 25*b* of the pupil selection sensor 24. The telephoto image light rays are reflected by the first telephoto reflection mirror 22*c* and the second telephoto reflection mirror 22*e*, and thus, the optical path thereof is turned. Accordingly, it is possible to decrease a length regarding a direction of the optical axis L of the second optical system 22 for imaging the telephoto image having a long focal length.

Therefore, in a case where both the first liquid crystal shutter 51 and the second liquid crystal shutter 52 are in the transmission state, the pupil selection sensor 24 can simultaneously image the wide angle image and the telephoto image by selectively receiving the wide angle image light rays W and the telephoto image light rays T.

Figure 7:
FIG. 7 is a diagram showing a wide angle image captured simultaneously with a telephoto image.
Figure 8:
FIG. 8 is a diagram showing a telephoto image captured simultaneously with a wide angle image.

FIGS. 7 and 8 are respectively diagrams showing examples of the wide angle image and the telephoto image captured simultaneously. FIGS. 7 and 8 show examples of a case where the wide angle image and the telephoto image do not interfere with each other (a case where the wide angle image light rays W are not completely incident on the second light receiving sensors 25*b* and the telephoto image light rays T are not completely incident on the first light receiving sensors 25*a*).

Figure 9:
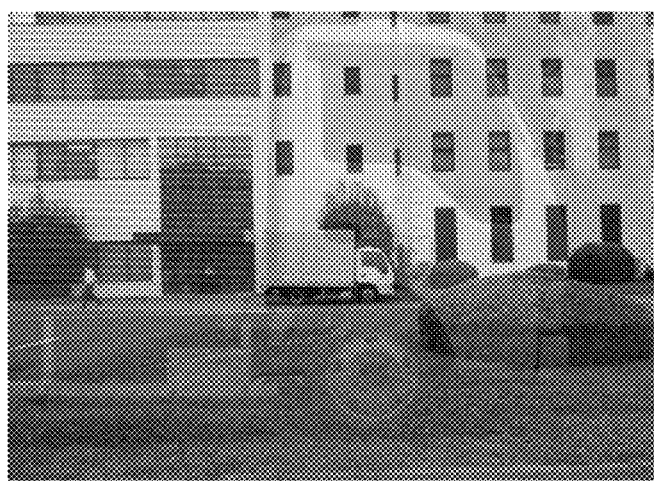
FIG. 9 is a diagram showing a wide angle image in which interference is caused.
Figure 10:
FIG. 10 is a diagram showing a telephoto image in which interference is caused.

In contrast, FIGS. 9 and 10 are respectively diagrams showing examples of the wide angle image and the telephoto image in a case where the wide angle image and the telephoto image interfere with each other. As shown in FIG.

9, the telephoto image interferes with the wide angle image, and a false image (a large image of a freight vehicle) resulting from the interference dimly appears on the image in addition to the original subject image (a small freight vehicle in the center of the image). Meanwhile, as shown in FIG. 10, the wide angle image interferes with the telephoto image, and a false image (a small image of the freight vehicle) resulting from the interference dimly appears in the center of the image in addition to the original subject (a large freight vehicle in the middle of the image).

As stated above, in the pupil selection sensor 24 according to the present embodiment, the ratio of sensitivity between the first light receiving sensors 25a and the second light receiving sensors 25b with respect to the wide angle image light rays is M:1. Accordingly, M/(M+1) light rays of the wide angle image light rays W are received by the first light receiving sensors 25a, and 1/(M+1) light rays interfere with the second light receiving sensors 25b. The ratio of sensitivity between the first light receiving sensors 25a and the second light receiving sensors 25b with respect to the telephoto image light rays T is 1:N. Accordingly, N/(N+1) light rays of the telephoto image light rays T are received by the second light receiving sensors 25b, and 1/(N+1) light rays interfere with the first light receiving sensors 25a.

<Case where First Liquid Crystal Shutter is in Transmission State and Second Liquid Crystal Shutter is in Shielding State>

Figure 11:
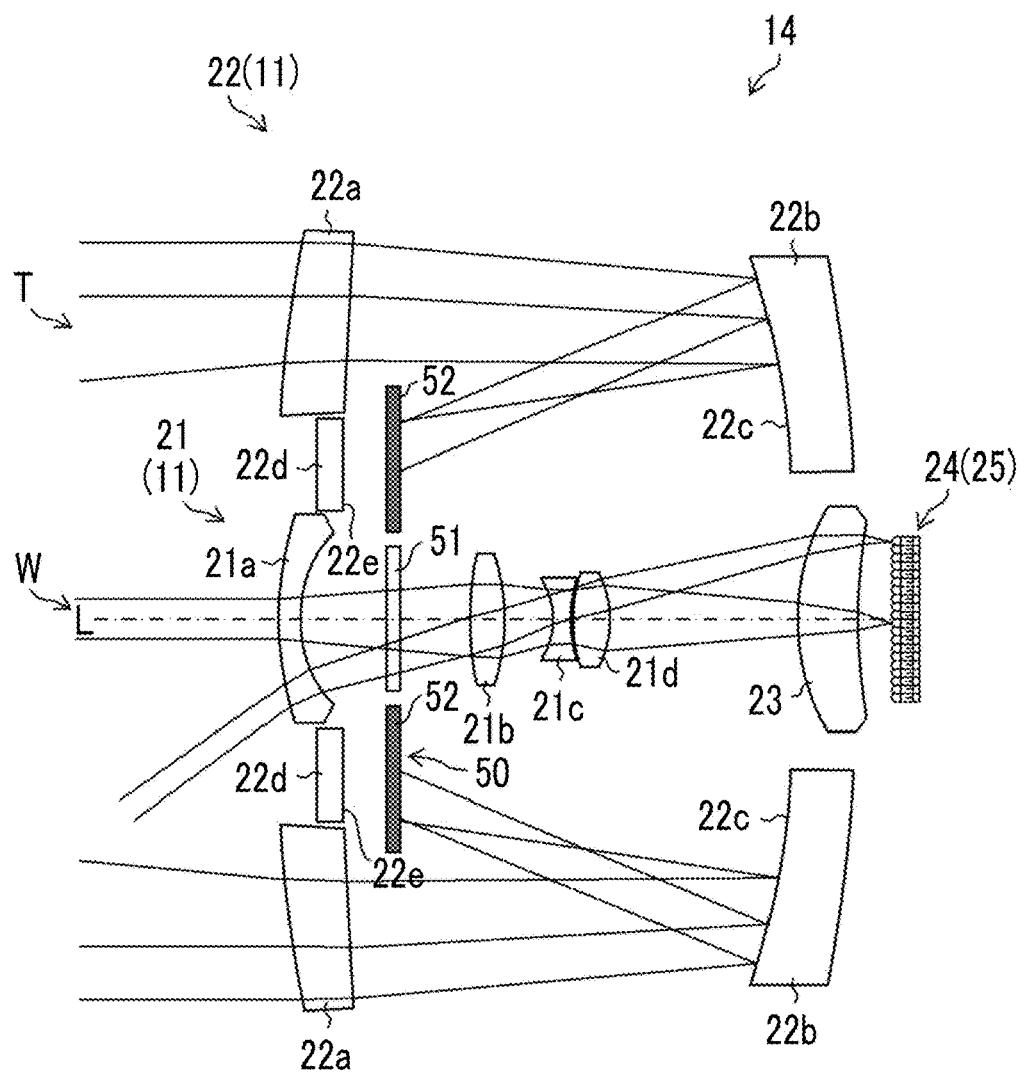
FIG. 11 is a diagram showing optical paths of wide angle image light rays and telephoto image light rays incident on the multiple-property lens and the pupil selection sensor.

FIG. 11 is a diagram showing the optical paths of the wide angle image light rays W and the telephoto image light rays T incident on the multiple-property lens 11 and the pupil selection sensor 24 shown in FIG. 2, and show a case where the first liquid crystal shutter 51 is in the transmission state and the second liquid crystal shutter 52 is in the shielding state.

The telephoto image light rays T pass through the first telephoto lens 22a, are reflected from the first telephoto reflection mirror 22c, and are incident on the second liquid crystal shutter 52. In this example, since the second liquid crystal shutter 52 is in the shielding state, the telephoto image light rays T incident on the second liquid crystal shutter 52 are shielded by the second liquid crystal shutter 52, and are not incident on the second telephoto reflection mirror 22e. As a result, the telephoto image is not formed on the second light receiving sensors 25b of the pupil selection sensor 24.

Meanwhile, since the first liquid crystal shutter 51 is in the transmission state, the wide angle image light rays W pass through the first wide angle lens 21a, the first liquid crystal shutter 51, the second wide angle lens 21b, the third wide angle lens 21c, the fourth wide angle lens 21d, and the common lens 23 of the first optical system 21 in order, and the wide angle image is formed on the first light receiving sensors 25a of the pupil selection sensor 24, similarly to the case shown in FIG. 5.

In this example, since the ratio of sensitivity between the first light receiving sensors 25a and the second light receiving sensors 25b with respect to the wide angle image light rays W is M:1, M/(M+1) light rays of the wide angle image light rays are received by the first light receiving sensors 25a, and 1/(M+1) light rays W are received by the second light receiving sensors 25b. Accordingly, the wide angle image is formed on the first light receiving sensors 25a, and the wide angle image is formed on the second light receiving sensors 25b with an exposure value which is 1/M of the wide angle image captured by the first light receiving sensors 25a.

Figure 12:
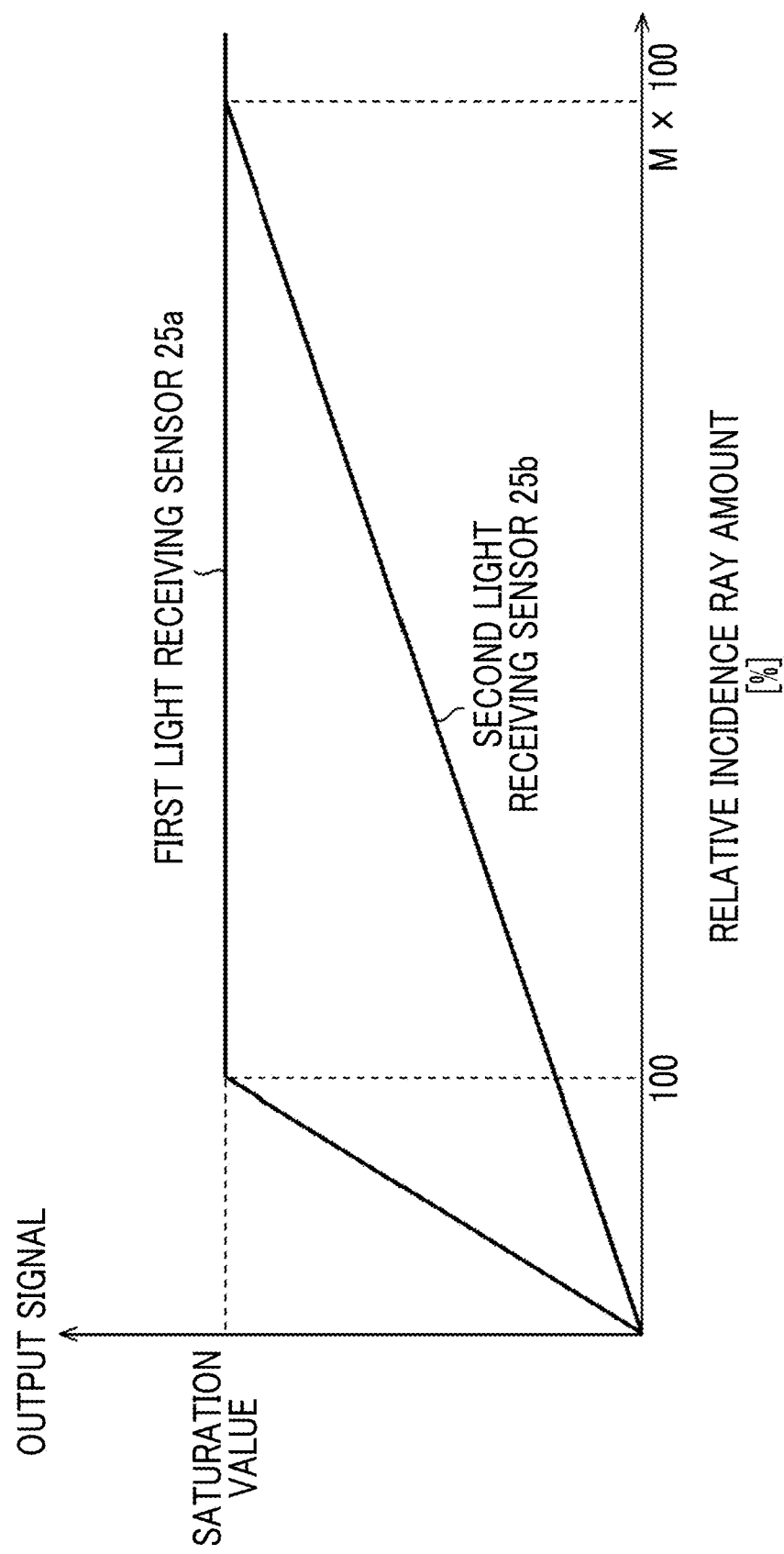
FIG. 12 is a graph showing photoelectrical conversion characteristics of first light receiving sensors and second light receiving sensors in a case where a first liquid crystal shutter is in a transmission state and a second liquid crystal shutter is in a shielding state.

FIG. 12 is a graph showing photoelectrical conversion characteristics of the first light receiving sensors 25a and the second light receiving sensors 25b in a case where the first liquid crystal shutter 51 is in the transmission state and the second liquid crystal shutter 52 is in the shielding state. A horizontal axis is a relative incidence ray amount, and a vertical axis is an output signal.

The output of the first light receiving sensors 25a increases in proportional to an increase in the relative incidence ray amount, and the output signal reaches a saturation value in a case where the relative incidence ray amount is 100%. Even though the relative incidence ray amount increases later, the output of the first light receiving sensors 25a is constant at the saturation value.

Meanwhile, the second light receiving sensors 25b have the sensitivity which is 1/M of the first light receiving sensors 25a, and the output signal thereof reaches a saturation value in a case where a relative incidence ray amount is M×100%.

As mentioned above, the first liquid crystal shutter 51 is in the transmission state and the second liquid crystal shutter 52 is in the shielding state, and thus, it is possible to simultaneously image two wide angle images (a wide angle image with a high sensitivity and a wide angle image with a low sensitivity) of which exposure values are different.

<Case where First Liquid Crystal Shutter is in Shielding State and Second Liquid Crystal Shutter is in Transmission State>

Figure 13:
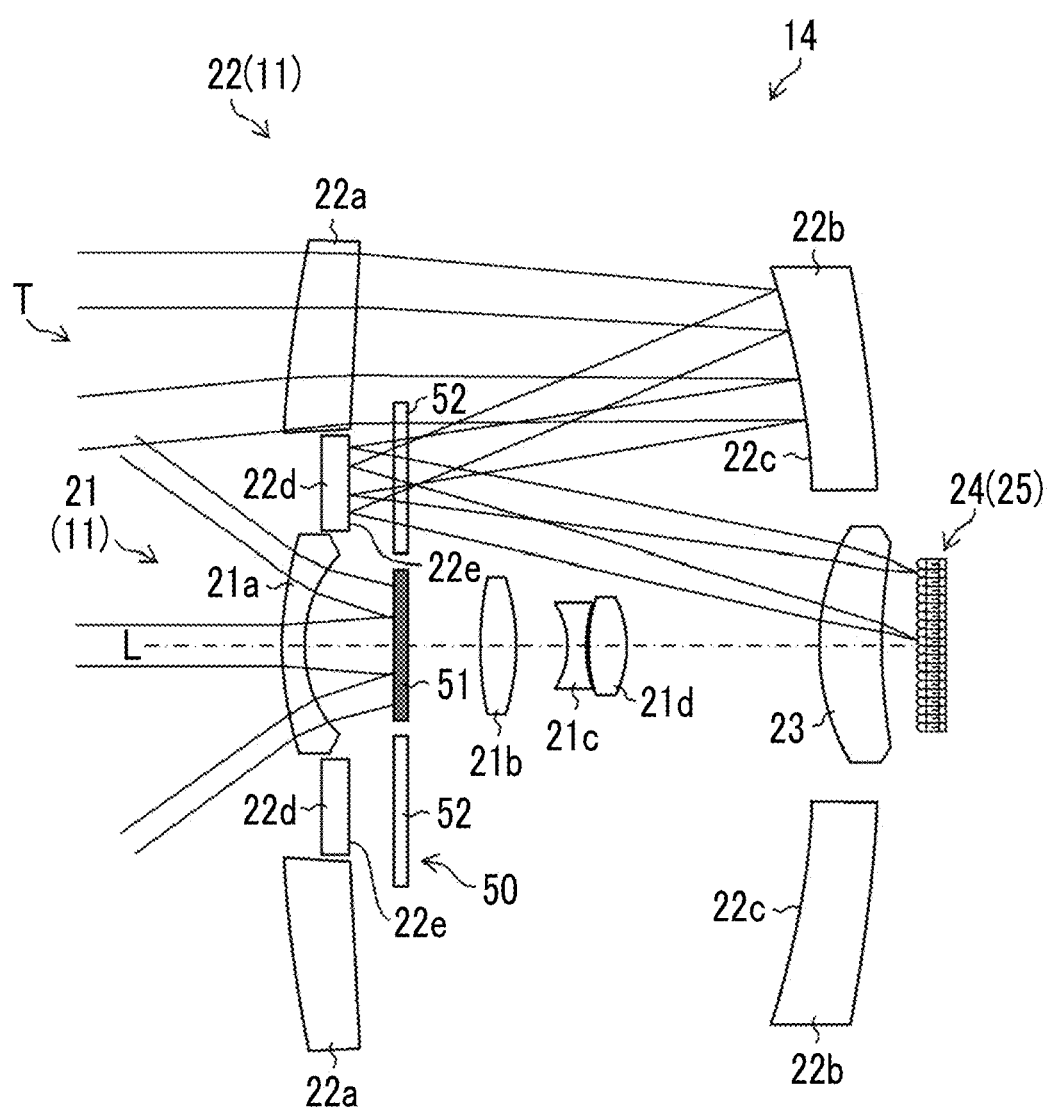
FIG. 13 is a diagram showing the optical paths of the wide angle image light rays and the telephoto image light rays incident on the multiple-property lens and the pupil selection sensor.

FIG. 13 is a diagram showing the optical paths of the wide angle image light rays W and the telephoto image light rays T incident on the multiple-property lens 11 and the pupil selection sensor 24 shown in FIG. 2. In this example, the first liquid crystal shutter 51 is in the shielding state, and the second liquid crystal shutter 52 is in the transmission state.

The wide angle image light rays W pass through the first wide angle lens 21a of the first optical system 21, and are incident on the first liquid crystal shutter 51. In this example, since the first liquid crystal shutter 51 is in the shielding state, the wide angle image light rays W incident on the first liquid crystal shutter 51 are shielded by the first liquid crystal shutter 51, and are not incident on the second wide angle lens 21b. As a result, the wide angle image is not formed on the first light receiving sensors 25a of the pupil selection sensor 24.

Meanwhile, since the second liquid crystal shutter 52 is in the transmission state, the telephoto image light rays T pass through the first telephoto lens 22a, and are reflected from the first telephoto reflection mirror 22c. Subsequently, the telephoto image light rays pass through the second liquid crystal shutter 52, and are reflected from the second telephoto reflection mirror 22e. Thereafter, the telephoto image light rays pass through the second liquid crystal shutter 52 and the common lens 23, and the telephoto image is formed on the pupil selection sensor 24.

In this example, since the ratio of sensitivity between the first light receiving sensors 25a and the second light receiving sensors 25b with respect to the telephoto image light rays T is 1:N, N/(N+1) light rays of the telephoto image light rays are received by the second light receiving sensors 25b, and 1/(N+1) light rays T are received by the first light receiving sensors 25a. Accordingly, the telephoto image is formed on the second light receiving sensors 25b, and the telephoto image is formed on the first light receiving sensors 25a with an exposure value which is 1/N of the telephoto image captured by the second light receiving sensors 25b.

Figure 14:
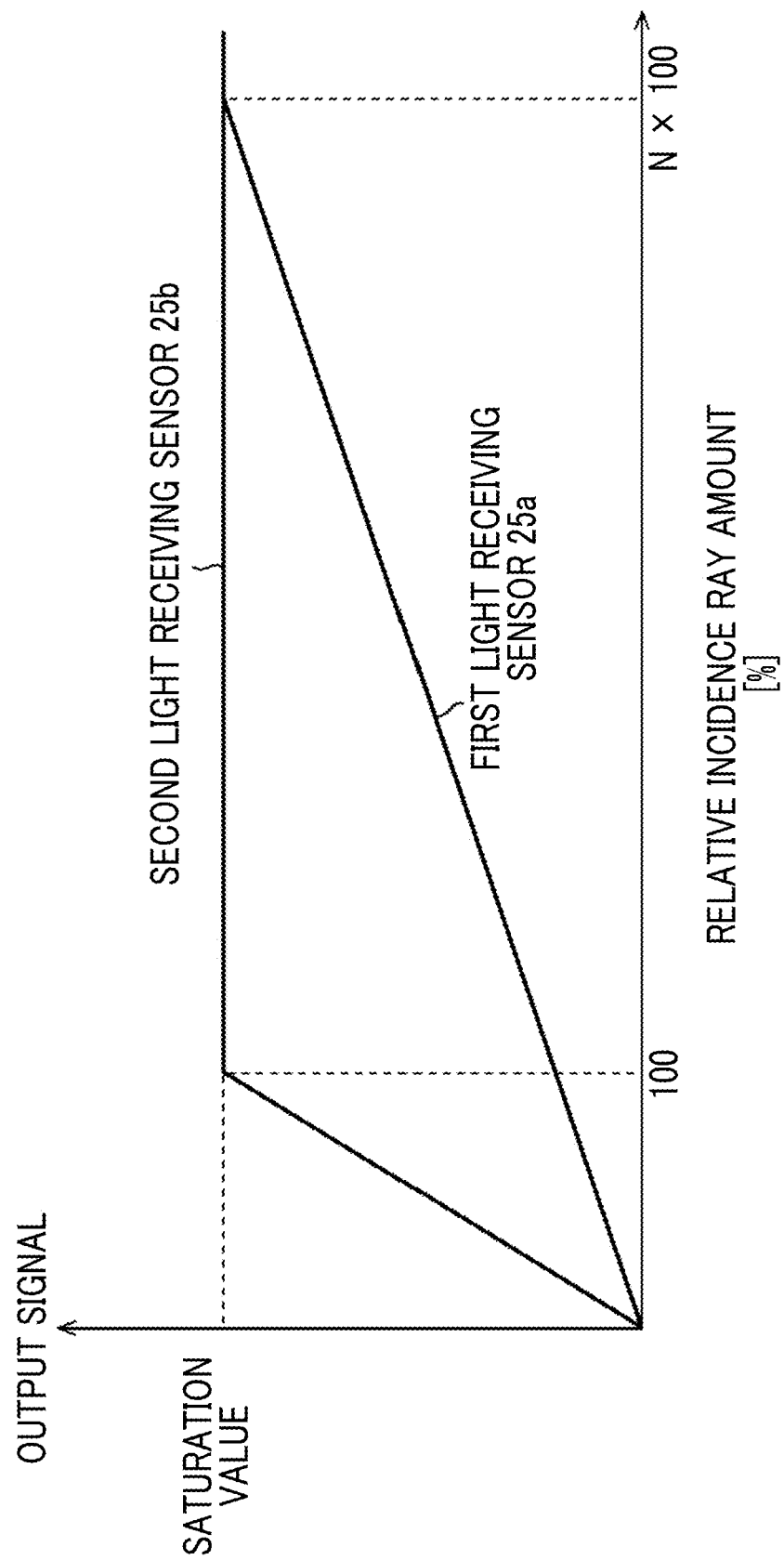
FIG. 14 is a graph showing photoelectrical conversion characteristics of the first light receiving sensors and the second light receiving sensors in a case where the first liquid crystal shutter is in the shielding state and the second liquid crystal shutter is in the transmission state.

FIG. 14 is a graph showing photoelectrical conversion characteristics of the first light receiving sensors 25a and the second light receiving sensors 25b in a case where the first liquid crystal shutter 51 is in the shielding state and the second liquid crystal shutter 52 is in the transmission state. A horizontal axis is a relative incidence ray amount, and a vertical axis is an output signal.

The output of the second light receiving sensors 25b increases in proportional to an increase in the relative incidence ray amount, and the output signal reaches a saturation value in a case where the relative incidence ray amount is 100%. Thereafter, even though the relative incidence ray amount increases, the output of the second light receiving sensors 25b is constant at the saturation value.

Meanwhile, the first light receiving sensors 25a have the sensitivity which is 1/N of the second light receiving sensors 25b, and the output signal thereof reaches a saturation value in a case where the relative incidence ray amount is N×100%.

As stated above, the first liquid crystal shutter 51 is in the shielding state and the second liquid crystal shutter 52 is in the transmission state, and thus, it is possible to simultaneously image two telephoto images (a telephoto image with a high sensitivity and a telephoto image with a low sensitivity) of which exposure values are different.

[Functional Configuration of Digital Camera]

Figure 15:
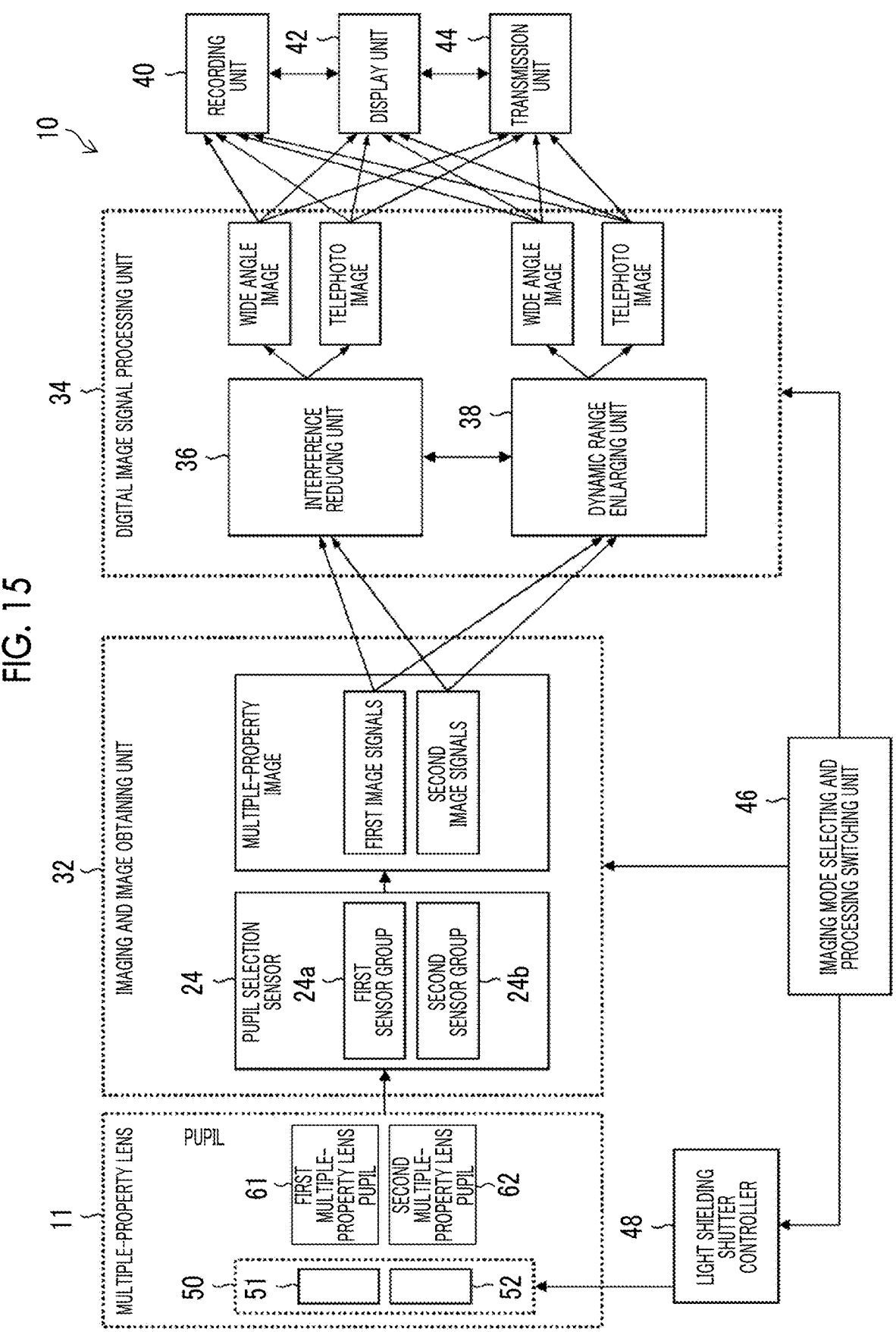
FIG. 15 is a block diagram showing a functional configuration example of the digital camera.

FIG. 15 is a block diagram showing a functional configuration example of the digital camera 10 according to the present embodiment. As shown in this diagram, the digital camera 10 includes an imaging and image obtaining unit 32 that obtains multiple-property images, a digital image signal processing unit 34 that performs signal processing on the multiple-property image, a recording unit 40, a display unit 42 and a transmission unit 44 that respectively records, displays and transmits the multiple-property image on which the signal processing is performed, a imaging mode selecting and processing switching controller 46 that switches between operations of the digital camera 10, and a light shielding shutter controller 48 that controls the light shielding unit 50, in addition to the multiple-property lens 11 and the pupil selection sensor 24. The respective functions of the imaging and image obtaining unit 32, the digital image signal processing unit 34, the imaging mode selecting and processing switching controller 46, and the light shielding shutter controller 48 may be realized through an operation of a processor such as a central processing unit (CPU) within the digital camera 10, or may be realized by a programmable logic device (PLD) which is a processor capable of changing a circuit configuration after a field-programmable gate array (FPGA) is manufactured, a dedicated electric circuit which is a processor having a circuit configuration designed as a dedicated circuit for performing specific processing, such as an Application-Specific Integrated Circuit (ASIC), or combinations thereof.

The wide angle image light rays W passed through a first multiple-property lens pupil 61 corresponding to the first optical system 21 (see FIG. 2) are received by the first sensor group 24a of the pupil selection sensor 24, and the telephoto image light rays T passed through a second multiple-property lens pupil 62 corresponding to the second optical system 22 (see FIG. 2) are received by the second sensor group 24b of the pupil selection sensor 24.

The imaging and image obtaining unit 32 comprises the pupil selection sensor 24. The imaging and image obtaining unit 32 (an example of an image reading-out unit) obtains the first image signals from the first sensor group 24a of the pupil selection sensor 24, and obtains the second image signals from the second sensor group 24b. The first image signal and the second image signal are input to the digital image signal processing unit 34.

The digital image signal processing unit 34 comprises an interference reducing unit 36, and a dynamic range enlarging unit 38.

The interference reducing unit 36 generates wide angle image data and telephoto image data which are respectively obtained by reducing the interfered second image signals and the interfered first image signals from the first image signals and the second image signals obtained by the imaging and image obtaining unit 32 in a case where the first liquid crystal shutter 51 and the second liquid crystal shutter 52 are in the transmission state.

The dynamic range enlarging unit 38 generates wide angle image data and telephoto image data which are respectively obtained by enlarging dynamic ranges from the first image signals and the second image signals obtained by the imaging and image obtaining unit 32 in a case where any of the first liquid crystal shutter 51 and the second liquid crystal shutter 52 is in the shielding state.

The image data items generated by the digital image signal processing unit 34 are sent to the recording unit 40, the display unit 42, and/or the transmission unit 44.

The recording unit 40 comprises a recording medium built in the digital camera 10 and/or a recording medium capable of being detached from the digital camera 10, and records the image data items sent from the digital image signal processing unit 34 in these recording media.

The display unit 42 comprises a liquid crystal monitor, and displays the image data items sent from the digital image signal processing unit 34 on the liquid crystal monitor.

The transmission unit 44 transmits the image data items sent from the digital image signal processing unit 34 via communication means such as a wireless local area network (LAN).

The imaging mode selecting and processing switching controller 46 controls processing in the imaging and image obtaining unit 32, the digital image signal processing unit 34, and the light shielding shutter controller 48 so as to correspond to an imaging mode selected by a user of the digital camera 10 who uses a manipulation unit (not shown).

The light shielding shutter controller 48 (an example of a first light shielding controller and an example of a second light shielding controller) controls the transmission states and the shielding states of the first liquid crystal shutter 51 and the second liquid crystal shutter 52.

[Configuration of Dynamic Range Enlarging Unit]

Figure 16:
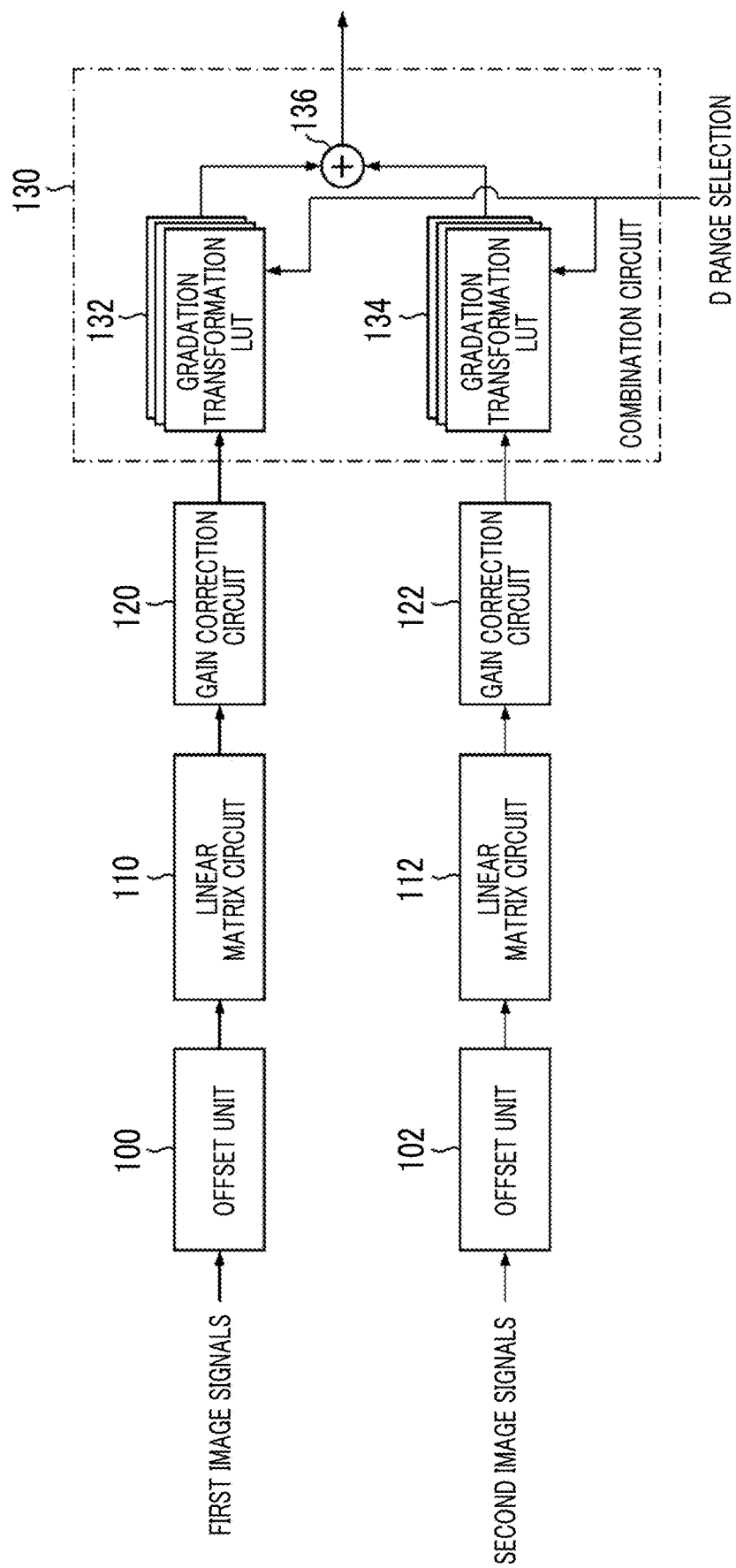
FIG. 16 is a block diagram showing a detailed circuit configuration of a dynamic range enlarging unit.

FIG. 16 is a block diagram showing a detailed circuit configuration of the dynamic range enlarging unit 38 shown in FIG. 15. As shown in this diagram, the dynamic range enlarging unit 38 comprises offset units 100 and 102, linear matrix circuits 110 and 112, gain correction circuits 120 and 122, and a combination circuit 130.

In this example, in a case where M 4 and the first liquid crystal shutter 51 is in the transmission state and the second liquid crystal shutter 52 is in the shielding state, dynamic range enlargement in a case where two wide angle images including a high-sensitivity wide angle image and a low-sensitivity wide angle image are simultaneously captured will be described.

The first image signals and the second image signals are respectively input to the offset units 100 and the offset unit 102, and are offset.

The offset first image signals and second image signals are respectively output to the linear matrix circuits 110 and 112, and tone correction for correcting spectral characteristics of the pupil selection sensor 24 is performed on these first and second image signals in these circuits.

The first image signals and the second image signals output from the linear matrix circuits 110 and 112 are respectively output to the gain correction circuits 120 and 122. The gain correction circuits 120 and 122 performs white balance adjustment by respectively applying gains for adjusting white balance to R, G, and B image signals. The first image signals and the second image signals output from the gain correction circuits 120 and 122 are respectively output to the combination circuit 130.

The combination circuit 130 primarily includes a gradation transformation look-up table (LUT) 132 for the high-sensitivity image data, a gradation transformation LUT 134 for the low-sensitivity image data, and an adder 136.

The gradation transformation LUTs 132 and 134 include six gradation transformation LUTs which respectively correspond to six dynamic ranges (100%, 130%, 170%, 230%, 300%, and 400%) which are equal to or less than M×100% in this example, and the corresponding gradation transformation LUTs are selected among the six gradation transformation LUTs according to enlargement ratios of the dynamic ranges selected by the manipulation unit (not shown).

Gradation transformation is performed on the first image signals and the second image signals input to the combination circuit 130 according to the gradation transformation LUTs selected among the gradation transformation LUTs 132 and 134 based on the enlargement ratios of the dynamic ranges, and the transformed first and second image signals are output to the adder 136.

The adder 136 performs antilogarithm combination (addition) of the first image signals and the second image signals on which the gradation transformation is performed according to the gradation transformation LUTs 132 and 134.

Figure 17:
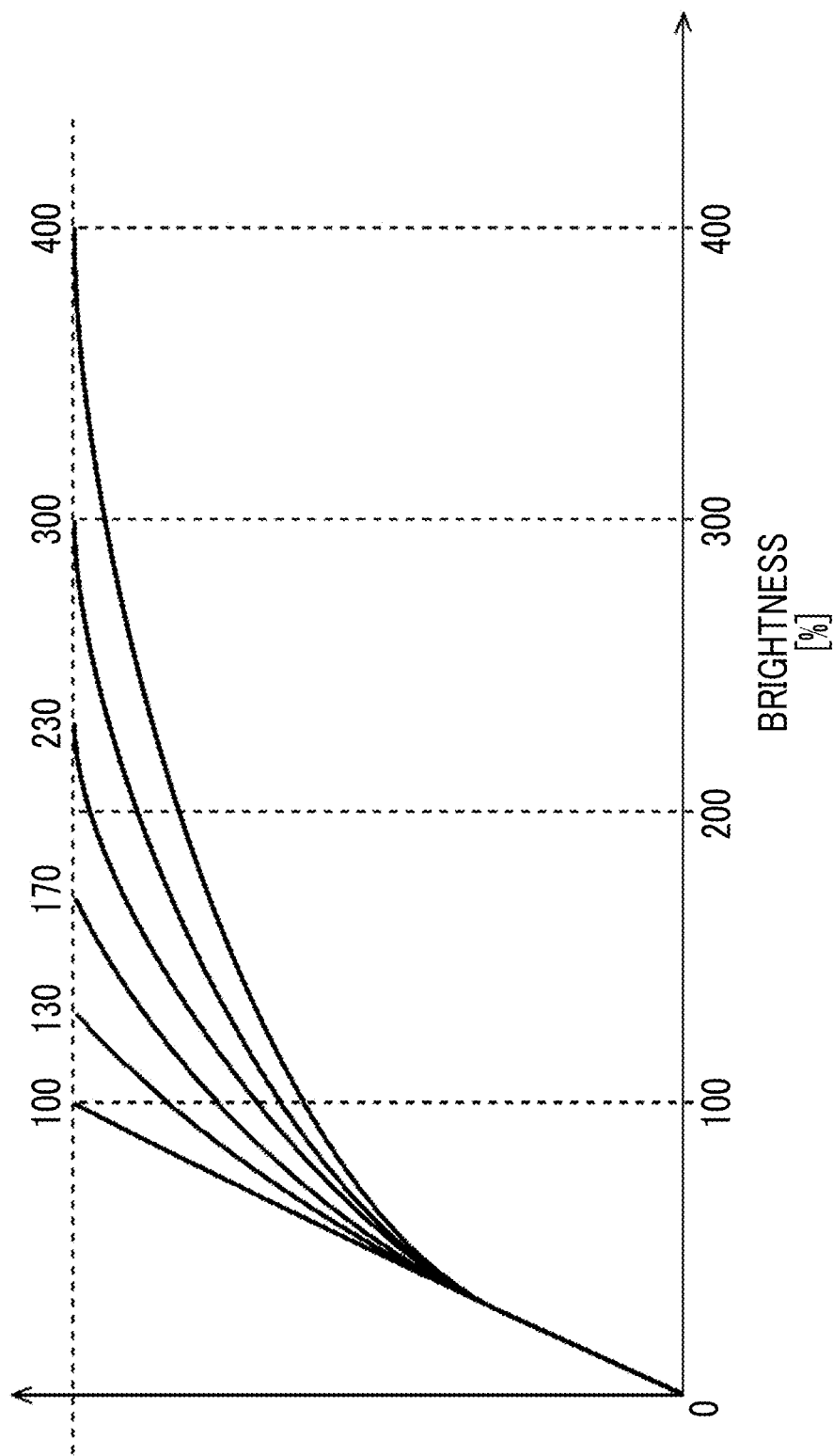
FIG. 17 is a diagram showing signal levels of combined image data items combined according to dynamic ranges by using a combination circuit.

FIG. 17 is a diagram showing signal levels of combined image data items combined according to the dynamic ranges by the combination circuit 130. As shown in this diagram, the image data items are combined such that the maximum values of the signal levels of the combined image data items combined according to the dynamic ranges are equal to each other and the signal levels are smoothly changed from a brightness of 0 over the maximum brightness of the dynamic ranges. That is, the gradation transformation is performed according to the gradation transformation LUTs 132 and 134 such that the combination result shown in FIG. 17 is obtained.

In this example, in a case where the set dynamic range is 100%, only the first image signals are used without combining the first image signals and the second image signals, and the gradation transformation of the first image signals is not performed. Accordingly, the gradation transformation LUTs 132 and 134 include five gradation transformation LUTs corresponding to five dynamic ranges except for a case where the dynamic range is 100%.

The demosaicing process is performed on the combined dot-sequential R, G, and B image signals output from the adder 136 of the combination circuit 130, and the demosaiced image signals are converted into brightness signals Y and color difference signals Cr and Cb. The brightness signals Y and the color difference signals Cr and Cb are recorded in the recording unit 40, are displayed on the display unit 42, and/or are transmitted by the transmission unit 44.

Although it has been described in this example that the maximum enlargement ratio of the dynamic range is 400%, the maximum enlargement ratio of the dynamic range of the wide angle image may be M×100%, and the maximum enlargement ratio of the dynamic range of the telephoto image may be N×100%.

[Imaging Method of Digital Camera]

Figure 18:
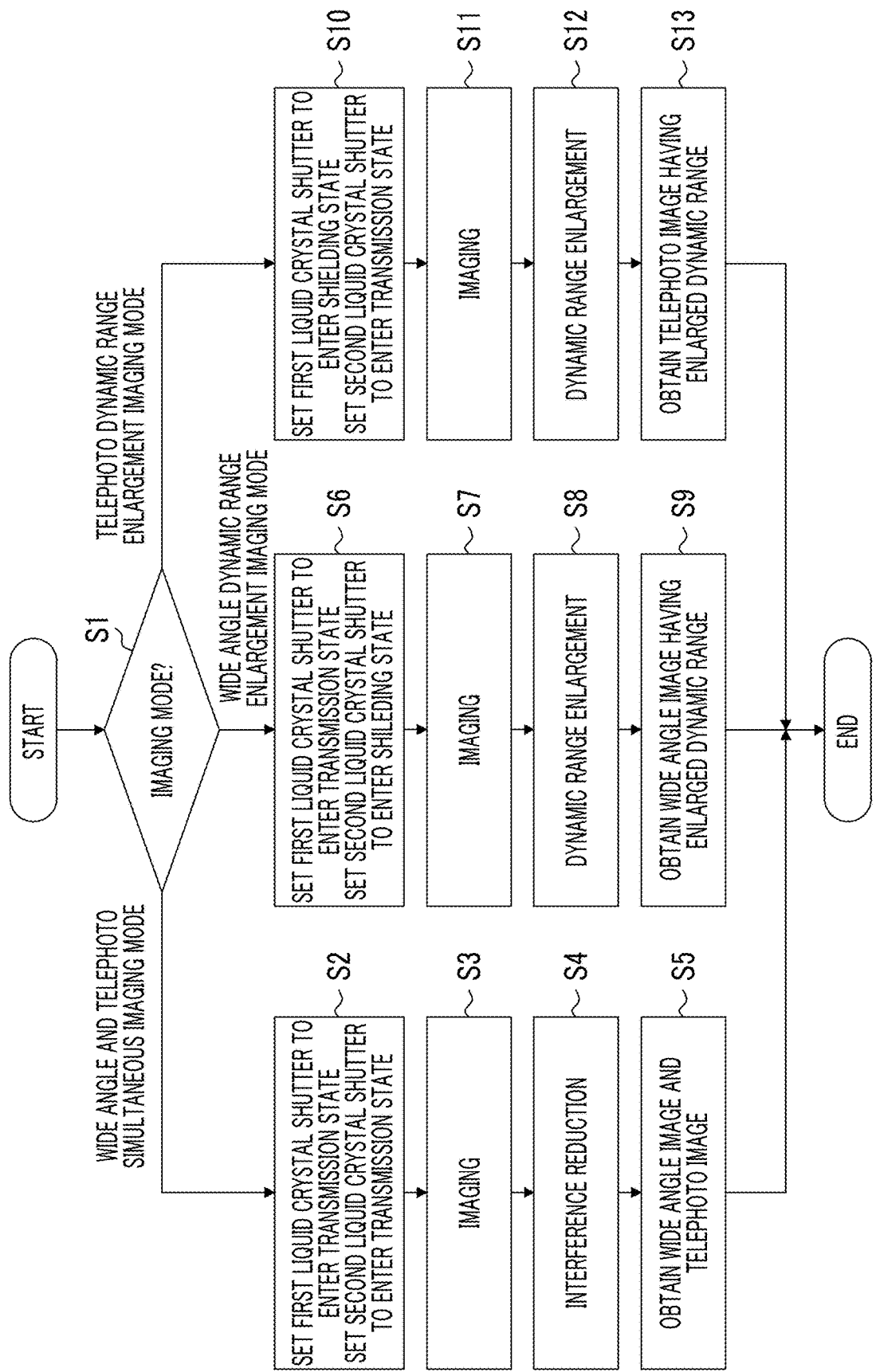
FIG. 18 is a flowchart showing an example of an imaging method using the digital camera.

FIG. 18 is a flowchart showing an example of an imaging method using the digital camera 10.

The user of the digital camera 10 can set an imaging mode of the digital camera 10 by using the manipulation unit (not shown). In the present embodiment, it is assumed that the imaging mode is selectable among a wide angle and telephoto simultaneous imaging mode, a wide angle dynamic range enlargement imaging mode, and a telephoto dynamic range enlargement imaging mode.

The imaging mode selecting and processing switching controller 46 determines the imaging mode set by the digital camera 10 in step S1. The processing proceeds to step S2 in a case where the set imaging mode is the wide angle and telephoto simultaneous imaging mode, proceeds to step S6 in a case where the set imaging mode is the wide angle dynamic range enlargement imaging mode, and proceeds to step S10 in a case where the set imaging mode is the telephoto dynamic range enlargement imaging mode.

In a case where it is determined that the set imaging mode is the wide angle and telephoto simultaneous imaging mode, the light shielding shutter controller 48 sets the first liquid crystal shutter 51 and the second liquid crystal shutter 52 to enter the transmission states in step S2.

Thereafter, in step S3, the user presses the release button 13, and thus, the imaging and image obtaining unit 32 obtains the first image signals from the first sensor group 24a of the pupil selection sensor 24 and obtains the second image signals from the second sensor group 24b (an example of an image reading-out step).

The first image signals and the second image signals are input to the digital image signal processing unit 34, and interference reduction is performed on the first and second image signals by the interference reducing unit 36 in step S4.

An interference ratio between the first image signals and the second image signals is determined by the ratio of sensitivity between the first light receiving sensors 25a and the second light receiving sensors 25b. In a case where a value of a certain pixel of the first image signal is $T_1$, a value of a corresponding pixel (adjacent pixel) of the second image signal is $W_1$, and values of true pixels in a case where there is no interference between these pixels are respectively $T_2$ and $W_2$, the following Expressions 1 and 2 are established.

$$T_1=(M{\times}T_2+W_2)/(M+1) \quad \text{(Expression 1)}$$

$$W_1=(T_2+N{\times}W_2)/(N+1) \quad \text{(Expression 2)}$$

$T_2$ and $W_2$ of the pixels are obtained by using Expressions 1 and 2, and thus, it is possible to obtain the image signals in which the interference is reduced.

At the end, in step S5, the wide angle image is obtained based on $T_2$, and the telephoto image is obtained based on $W_2$ (an example of an image generating step).

In a case where it is determined that the set imaging mode is the wide angle dynamic range enlargement imaging mode in step S1, the light shielding shutter controller 48 sets the first liquid crystal shutter 51 to enter in the transmission state, and sets the second liquid crystal shutter 52 to enter the shielding state in step S6 (an example of a first light shielding control step).

Thereafter, in step S7, the user presses the release button 13, and thus, the imaging and image obtaining unit 32 obtains the first image signals from the first sensor group 24a of the pupil selection sensor 24 and obtains the second image signals from the second sensor group 24b. In this example, since the second liquid crystal shutter 52 is in the shielding state, the telephoto image light rays T are not incident on the first sensor group 24a and the second sensor group 24b. The wide angle image light rays W are received by the first sensor group 24a at a ratio of M/(M+1), and are received by the second sensor group 24b at a ratio of 1/(M+1).

The first image signals to be output from the first sensor group 24a and the second image signals to be output from the second sensor group 24b are input to the digital image signal processing unit 34. The dynamic range enlarging unit 38 of the digital image signal processing unit 34 performs the dynamic range enlargement of the first image signals and the second image signals according to the dynamic range enlargement ratios selected by the manipulation unit (not shown) in step S8, and obtains a wide angle image obtained by enlarging the dynamic range in step S9 (an example of a dynamic range enlarging step).

According to the wide angle dynamic range enlargement imaging mode, it is possible to obtain a wide angle image (an example of a third image) having a dynamic range which is M times the dynamic range of the wide angle image in the wide angle and telephoto simultaneous imaging mode. The wide angle image is not limited to the image having the dynamic range of M times, and a wide angle image having a dynamic range of M times or less may be obtained.

In a case where it is determined that the set imaging mode is the telephoto dynamic range enlargement imaging mode in step S1, the light shielding shutter controller 48 sets the first liquid crystal shutter 51 to enter the shielding state and sets the second liquid crystal shutter 52 to enter the transmission state in step S10.

Thereafter, in step S11, the user presses the release button 13, and thus, the imaging and image obtaining unit 32 obtains the first image signals from the first sensor group 24a of the pupil selection sensor 24 and obtains the second image signals from the second sensor group 24b (an example of an image reading-out step). In this example, since the first liquid crystal shutter 51 is in the shielding state, the wide angle image light rays W are not incident on the first sensor group 24a and the second sensor group 24b. The telephoto image light rays T are received by the first sensor group 24a at a ratio of 1/(N+1), and are received by the second sensor group 24b at a ratio of N/(N+1).

The first image signals to be output from the first sensor group 24a and the second image signals to be output from the second sensor group 24b are input to the digital image signal processing unit 34. The dynamic range enlarging unit 38 of the digital image signal processing unit 34 performs the dynamic range enlargement of the first image signals and the second image signals according to the dynamic range enlargement ratios selected by the manipulation unit (not shown) in step S12, and obtains a telephoto image obtained by enlarging the dynamic ranges in step S13.

According to the telephoto dynamic range enlargement imaging mode, it is possible to obtain a telephoto image (an example of a fourth image) having a dynamic range which is N times the dynamic range of the telephoto image in the wide angle and telephoto simultaneous imaging mode. The telephoto image is not limited to the image having the dynamic range of N times, and a telephoto image having a dynamic range of N times or less may be obtained.

The respective images obtained in the respective imaging modes may be recorded, displayed, and/or transmitted by the recording unit 40, the display unit 42, and the transmission unit 44.

It has been described in this example that the wide angle image having the dynamic range of M times or less in the wide angle dynamic range enlargement imaging mode is obtained and the telephoto image having the dynamic range of N times or less is obtained in the telephoto dynamic range enlargement imaging mode. The user manipulates the release button 13 once, and thus, the wide angle image having the dynamic range of M times or less and the telephoto image having the dynamic range of N times or less may be captured. In this case, the imaging may be performed by switching between the transmission state and the shielding state of the first liquid crystal shutter 51 and the second liquid crystal shutter 52 in order.

The wide angle image having the enlarged dynamic range and the telephoto image having the enlarged dynamic range may be continuously and alternately captured, and a motion picture of the wide angle image and a motion picture of the telephoto image may be captured.

Second Embodiment

Figure 19:
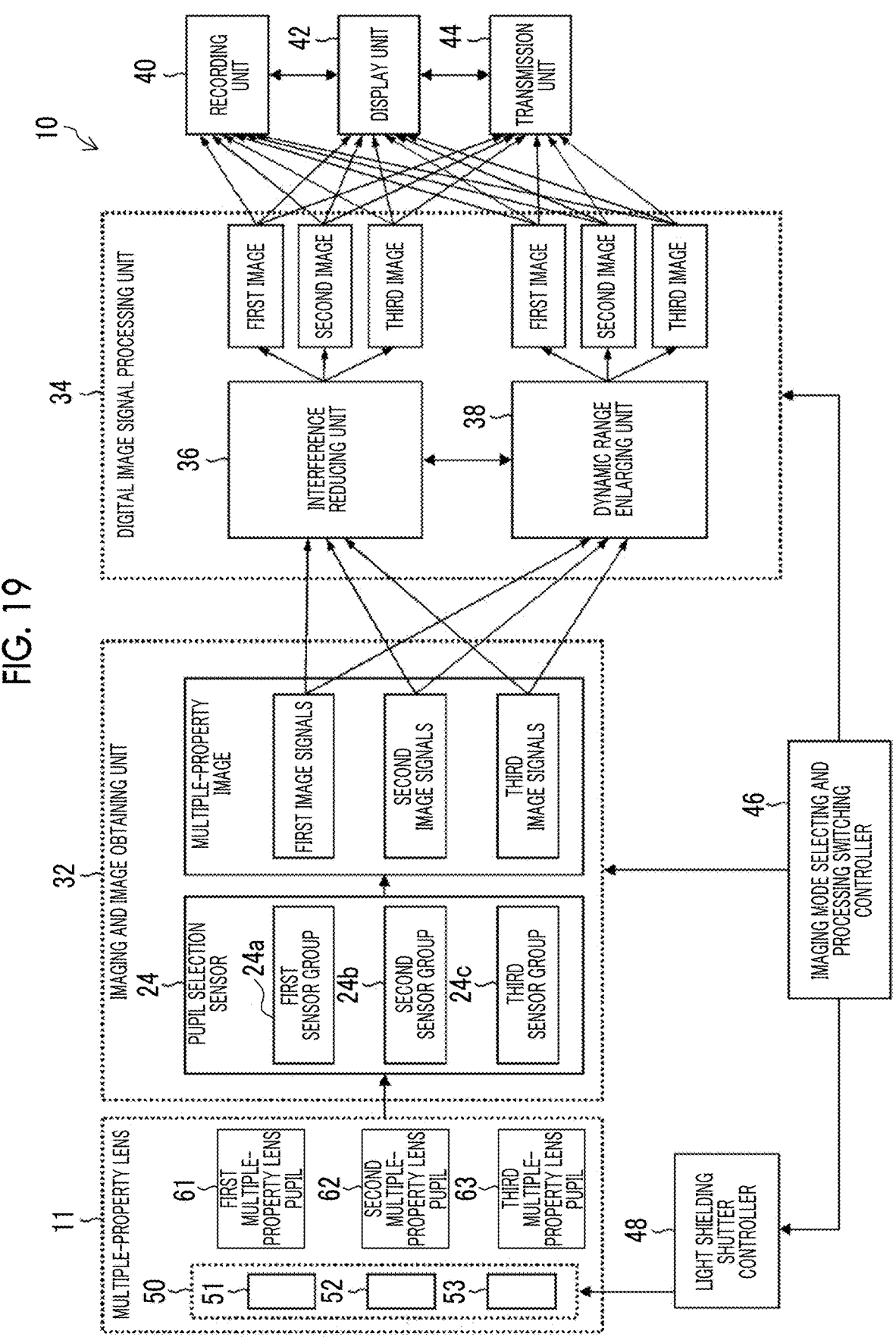
FIG. 19 is a block diagram showing a functional configuration example of the digital camera.

FIG. 19 is a block diagram showing a functional configuration example of a digital camera 10 according to a second embodiment. Portions common with those in the block diagram shown in FIG. 15 will be assigned the same references, and the detailed description thereof will be omitted.

A multiple-property lens 11 has a first optical system (not shown) having first characteristics, a second optical system (not shown) having second characteristics, and a third optical system (not shown) having third characteristics. A first liquid crystal shutter 51, a second liquid crystal shutter 52, and a third liquid crystal shutter 53 for switching between the transmission and the shielding of light are arranged so as to correspond to the first optical system, the second optical system, and the third optical system.

A pupil selection sensor 24 is a directional sensor configured such that a plurality of light receiving sensors has directivity with respect to incidence angles of light rays. The pupil selection sensor 24 comprises a first sensor group 24a that selectively receives light rays passed through a first multiple-property lens pupil 61, a second sensor group 24b that selectively receives light rays passed through a second multiple-property lens pupil 62, and a third sensor group 24c that selectively receives light rays passed through a third multiple-property lens pupil 63.

In a case where the first liquid crystal shutter 51, the second liquid crystal shutter 52, and the third liquid crystal shutter 53 are in the transmission states, first light rays incident on the first optical system of the multiple-property lens 11 are received by the first sensor group 24a of the pupil selection sensor 24 through the first multiple-property lens pupil 61 corresponding to the first optical system. Similarly, second light rays incident on the second optical system are received by the second sensor group 24b through the second multiple-property lens pupil 62 corresponding to the second optical system, and third light rays incident on the third optical system are received by the third sensor group 24c through the third multiple-property lens pupil 63 corresponding to the third optical system.

As stated above, the first liquid crystal shutter 51, the second liquid crystal shutter 52, and the third liquid crystal shutter 53 are in the transmission states, and thus, the image having the first characteristics, the image having the second characteristics, and the image having the third characteristics can be simultaneously captured.

In the pupil selection sensor 24, interference is caused in the first sensor group 24a, the second sensor group 24b, and the third sensor group 24c. In this example, it is assumed that a ratio of sensitivity between light receiving sensors constituting the first sensor group 24a, light receiving sensors constituting the second sensor group 24b, and light receiving sensors constituting the third sensor group 24c is M1:M2: M3 in receiving the first light rays, is M4:M5:M6 in receiving the second light rays, and M7:M8:M9 in receiving the third light rays.

Accordingly, in a case where the first liquid crystal shutter 51 is in the transmission state and the second liquid crystal shutter 52 and the third liquid crystal shutter 53 are in the shielding states, three images of which a ratio of sensitivity is M1:M2:M3 can be simultaneously captured as the images having the first characteristics. For example, in a case where M1=100, M2=10, and M3=1, images having a dynamic range of 100 times or dynamic ranges of 100 times or less may be obtained.

In a case where the second liquid crystal shutter 52 is in the transmission state and the first liquid crystal shutter 51 and the third liquid crystal shutter 53 are in the shielding states, three images of which a ratio of sensitivity is M4:M5: M6 may be simultaneously captured as the images having the second characteristics, and the images having the second characteristics obtained by enlarging the dynamic ranges according to the ratio of sensitivity may be obtained.

Similarly, in a case where the third liquid crystal shutter 53 is in the transmission state and the first liquid crystal shutter 51 and the second liquid crystal shutter 52 are in the shielding states, three images of which a ratio of sensitivity is M7:M8:M9 may be simultaneously captured as the images having the third characteristics, and the images having the third characteristics obtained by enlarging the dynamic ranges according to the ratio of sensitivity may be obtained.

As mentioned above, a specific pupil region among a plurality of pupil regions is in an opened state, and the other pupil regions are in closed states. Accordingly, images of the pupil in the opened state are combined by using a sensitivity difference of the respective light receiving sensors of the pupil selection sensor 24 with respect to the light rays from the pupil region in the opened state, and thus, an image having a wide dynamic range can be obtained.

Third Embodiment

Figure 20:
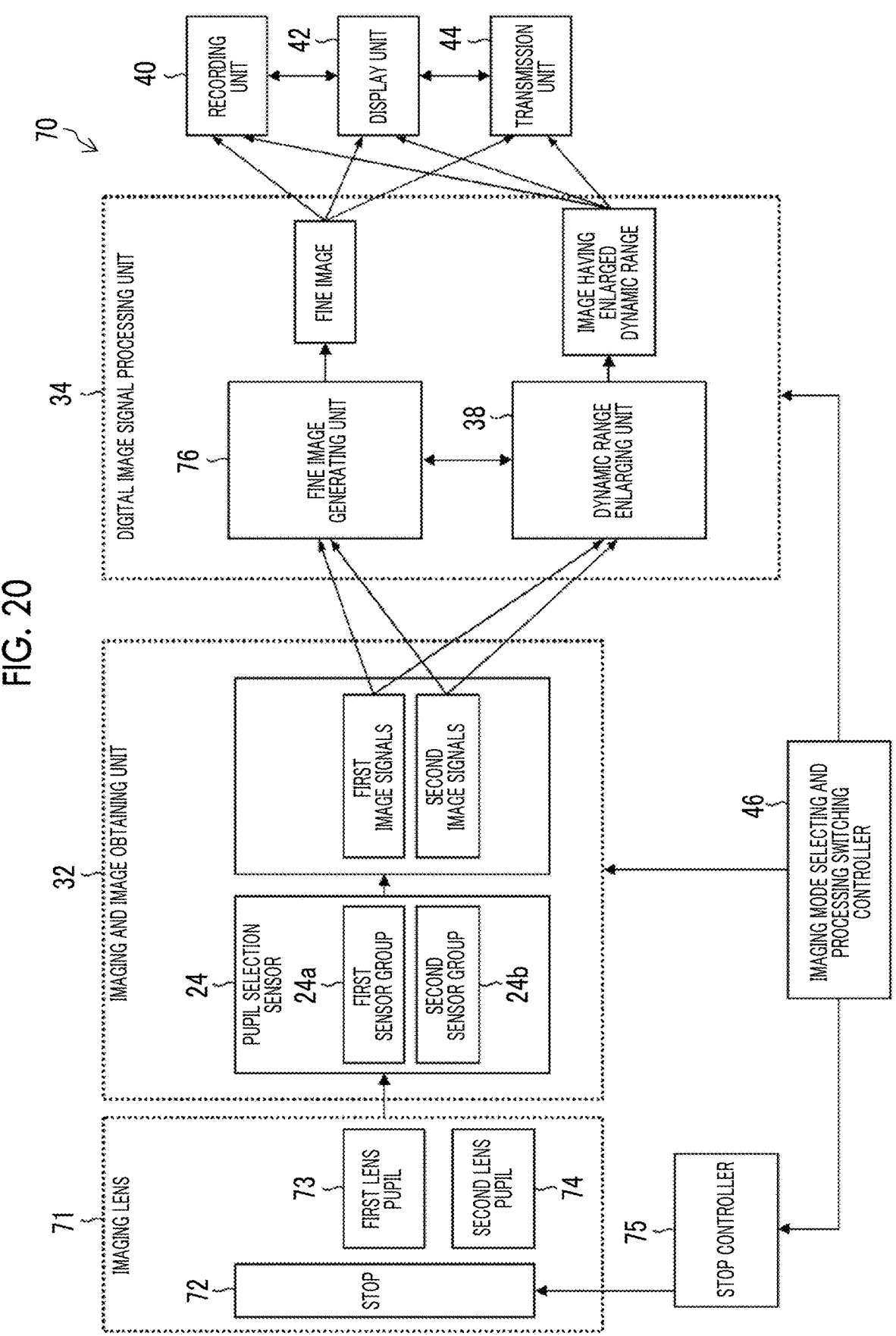
FIG. 20 is a block diagram showing a functional configuration example of the digital camera.

FIG. 20 is a block diagram showing a functional configuration example of a digital camera 70 according to a third embodiment. Portions common with those in the block diagram shown in FIG. 15 will be assigned the same references, and the detailed description thereof will be omitted.

The digital camera 70 comprises an imaging lens 71 having uniform characteristics in a region in which light rays are incident. The imaging lens 71 comprises a stop 72 that adjusts the amount of light rays incident on the pupil selection sensor 24 by forming a circular stop opening portion by using a plurality of stop leaf blades and changing an opening diameter. The size of the opening diameter of the stop 72 is controlled by a stop controller 75.

The pupil selection sensor 24 is a directional sensor configured such that a plurality of light receiving sensors 25 has directivity with respect to incidence angles of light rays, and has the same configuration as that of the pupil selection sensor 24 shown in FIG. 4.

The digital camera 70 comprises a fine image generating unit 76 in a digital image signal processing unit 34. The fine image generating unit 76 generates fine image data by using the first image signals obtained by a first sensor group 24a of the pupil selection sensor 24 and the second image signals obtained from a second sensor group 24b, as different pixels within the image, in parallel. The fine image data has a resolution which is two times higher than a resolution of the image data having the enlarged dynamic range which is generated by the dynamic range enlarging unit 38.

In a case where a fine imaging mode is set by the manipulation unit (not shown), the stop controller 75 sets the stop 72 to enter an opened state. In this case, light rays incident from near the center of the imaging lens 71 are incident on the first sensor group 24a of the pupil selection sensor 24 through a first lens pupil 73, and light rays incident from an edge part near the center of the imaging lens 71 are incident on the second sensor group 24b through a second lens pupil 74. An imaging and image obtaining unit 32 obtains the first image signals from the first sensor group 24a, and obtains the second image signals from the second sensor group 24b.

The first image signals and the second image signals are input to the digital image signal processing unit 34, and the fine image data is generated by the fine image generating unit 76.

As stated above, in a case where the stop 72 is in the opened state, the fine image may be obtained by using both the image signals of the first sensor group 24a and the second sensor group 24b in parallel.

Next, an operation in the dynamic range enlargement imaging mode will be described. In this example, it is assumed that a ratio of sensitivity between the first light receiving sensors 25a and the second light receiving sensors 25b with respect to the incidence rays from the first lens pupil 73 is M:1.

In a case where the dynamic range enlargement imaging mode is set by the manipulation unit (not shown), the stop controller 75 narrows the opening diameter of the stop 72, and shields the incidence rays from the second lens pupil 74. Accordingly, the light rays passed through the second lens pupil 74 are not incident on the pupil selection sensor 24.

The light rays, among the incidence rays incident on the imaging lens 71, which are incident on the pupil selection sensor 24 through the first lens pupil 73 are incident on the first sensor group 24a, and interfere with the second sensor group 24b. In this example, in the pupil selection sensor 24, a ratio of sensitivity between the first light receiving sensors 25a and the second light receiving sensor 25b with respect to the incidence rays from the first lens pupil 73 is M:1. Accordingly, M/(M+1) light rays of the incidence rays are received by the first light receiving sensors 25a, and 1/(M+1) light rays interfere with the second light receiving sensors 25b.

The imaging and image obtaining unit 32 obtains the first image signals from the first sensor group 24a of the pupil selection sensor 24, and obtains the second image signals from the second sensor group 24b. The first image signal and the second image signal are input to the digital image signal processing unit 34.

The dynamic range enlarging unit 38 of the digital image signal processing unit 34 performs the dynamic range enlargement of the first image signals and the second image signals according to the dynamic range enlargement ratios selected by the manipulation unit (not shown).

As stated above, the incidence rays corresponding to the second lens pupil 74 are shielded by narrowing the opening diameter of the stop 72, only the incidence rays corresponding to the first lens pupil 73 are incident, and the incidence rays are received by the first light receiving sensors 25a and the second light receiving sensors 25b according to the ratio of sensitivity. Accordingly, it is possible to obtain the images having the enlarged dynamic ranges.

Although it has been described in this example that the imaging lens 71 having the uniform characteristics in the region in which the light rays are incident is used, the multiple-property lens 11 shown in FIG. 2 may be used. In a case where the multiple-property lens 11 is used and the stop 72 is in the opened state, it is possible to simultaneously image the wide angle image and the telephoto image. In a case where the incidence rays from the second optical system 22 are shielded by narrowing the opening diameter of the stop 72, it is possible to obtain the images obtained by enlarging the dynamic range of the wide angle image. That is, it is possible to obtain the images having the enlarged dynamic range with the imaging characteristics of the first optical system 21.

The present invention is widely applicable to an imaging device and an imaging method capable of imaging a plurality of images by using an imaging system comprising a directional sensor in which light receiving sensors have directivity with respect to incidence angles of light rays, and application technologies thereof, and the applicable technical field is not particularly limited. For example, the present invention is also applicable to an imaging device that automatically performs imaging in addition to an imaging device that images in response to a user manipulation, and the present invention is also applicable to an imaging device that images a motion picture in addition to an imaging device that images a still image.

The imaging method may be realized as a program for causing a computer to realize the respective steps, and may be realized as a non-transitory recording medium such as a compact disk read-only memory (CD-ROM) that stores computer-readable codes of the program.

The technical scope of the present invention is not limited to the scope described in the aforementioned embodiments. The configurations of the embodiments may be appropriately combined between the embodiments without departing from the gist of the present invention.

EXPLANATION OF REFERENCES

10: digital camera
11: multiple-property lens
12: flash light emitting unit
13: release button
14: imaging unit
21: first optical system
21a: first wide angle lens
21b: second wide angle lens
21c: third wide angle lens
21d: fourth wide angle lens
22: second optical system
22a: first telephoto lens
22b: first telephoto reflector
22c: first telephoto reflection mirror
22d: second telephoto reflector
22e: second telephoto reflection mirror
23: common lens
24: pupil selection sensor
24a: first sensor group
24b: second sensor group
24c: third sensor group
25: light receiving sensor
25a: first light receiving sensor
25b: second light receiving sensor
26: microlens
27: interlayer
28: light shielding mask
29: photodiode
32: imaging and image obtaining unit
34: digital image signal processing unit
36: interference reducing unit
38: dynamic range enlarging unit
40: recording unit
42: display unit
44: transmission unit
46: imaging mode selecting and processing switching controller
48: light shielding shutter controller
50: light shielding unit
51: first liquid crystal shutter
52: second liquid crystal shutter
53: third liquid crystal shutter
61: first multiple-property lens pupil
62: second multiple-property lens pupil
63: third multiple-property lens pupil
70: digital camera
71: imaging lens
72: stop
73: first lens pupil
74: second lens pupil
75: stop controller
76: fine image generating unit
100: offset unit
102: offset unit
110: linear matrix circuit
120: gain correction circuit
130: combination circuit
132: gradation transformation LUT
134: gradation transformation LUT
136: adder
Cr: color difference signal
L: optical axis
T: telephoto image light
W: wide angle image light
Y: brightness signal
S1 to S13: imaging method

What is claimed is:

1. An imaging device comprising:
an imaging lens that comprises a first optical system and a second optical system which are respectively provided in different regions;
a directional sensor in which a plurality of first light receiving sensors and a plurality of second light receiving sensors are arranged in a two-dimensional shape, a ratio of sensitivity between the first light receiving sensors and the second light receiving sensors with respect to first incidence rays incident through the first optical system being M:1 and a ratio of sensitivity between the first light receiving sensors and the second light receiving sensors with respect to second incidence rays incident through the second optical system being 1:N in a case where M and N are values greater than 1;
an image reading-out unit that obtains first image signals obtained from the plurality of first light receiving sensors and second image signals obtained from the plurality of second light receiving sensors;
an image generating unit that generates a first image from the first image signals and generates a second image from the second image signals;
a first light shielding controller that controls entering or shielding of the second incidence rays for the directional sensor; and a dynamic range enlarging unit that obtains the first image signals and the second image signals in a state in which the second incidence rays are shielded, and generates a third image having a dynamic range which is equal to or less than M times a dynamic range of the first image.

2. The imaging device according to claim 1,
wherein the first light shielding controller comprises a first shutter that switches between a transmission state and a shielding state of light rays.

3. The imaging device according to claim 2,
wherein the first shutter is disposed at an optical path of the second incidence rays.

4. The imaging device according to claim 1, further comprising:
a second light shielding controller that controls entering or shielding of the first incidence rays for the directional sensor,
wherein the dynamic range enlarging unit obtains the first image signals and the second image signals in a state in which the second incidence rays are incident and the first incidence rays are shielded, and generates a fourth image having a dynamic range which is N times a dynamic range of the second image.

5. The imaging device according to claim 2, further comprising:
a second light shielding controller that controls entering or shielding of the first incidence rays for the directional sensor,
wherein the dynamic range enlarging unit obtains the first image signals and the second image signals in a state in which the second incidence rays are incident and the first incidence rays are shielded, and generates a fourth image having a dynamic range which is N times a dynamic range of the second image.

6. The imaging device according to claim 3, further comprising:
a second light shielding controller that controls entering or shielding of the first incidence rays for the directional sensor,
wherein the dynamic range enlarging unit obtains the first image signals and the second image signals in a state in which the second incidence rays are incident and the first incidence rays are shielded, and generates a fourth image having a dynamic range which is N times a dynamic range of the second image.

7. The imaging device according to claim 4,
wherein the second light shielding controller comprises a second shutter that switches between a transmission state and a shielding state of light rays.

8. The imaging device according to claim 5,
wherein the second light shielding controller comprises a second shutter that switches between a transmission state and a shielding state of light rays.

9. The imaging device according to claim 6,
wherein the second light shielding controller comprises a second shutter that switches between a transmission state and a shielding state of light rays.

10. The imaging device according to claim 7,
wherein the second shutter is disposed at an optical path of the first incidence rays.

11. The imaging device according to claim 8,
wherein the second shutter is disposed at an optical path of the first incidence rays.

12. The imaging device according to claim 9,
wherein the second shutter is disposed at an optical path of the first incidence rays.

13. The imaging device according to claim 1,
wherein the first optical system and the second optical system have imaging characteristics different from each other.

14. The imaging device according to claim 2,
wherein the first optical system and the second optical system have imaging characteristics different from each other.

15. The imaging device according to claim 3,
wherein the first optical system and the second optical system have imaging characteristics different from each other.

16. The imaging device according to claim 13,
wherein one of the first optical system and the second optical system is a wide angle optical system, and the other one is a telephoto optical system of which a focal length is greater than a focal length of the wide angle optical system.

17. The imaging device according to claim 1,
wherein the imaging lens is configured such that the first optical system is disposed in a central part and the second optical system is disposed at an edge part of the first optical system in a ring shape.

18. The imaging device according to claim 1, further comprising:
a stop that adjusts the amount of light rays incident on the directional sensor,
wherein the first light shielding controller controls the entering or shielding of the second incidence rays for the directional sensor by the stop.

19. An imaging method of an imaging device which comprises an imaging lens that comprises a first optical system and a second optical system provided in different regions, and a directional sensor in which a plurality of first light receiving sensors and a plurality of second light receiving sensors are arranged in a two-dimensional shape, a ratio of sensitivity between the first light receiving sensors and the second light receiving sensors with respect to first incidence rays incident through the first optical system being M:1 and a ratio of sensitivity between the first light receiving sensors and the second light receiving sensors with respect to second incidence rays incident through the second optical system being 1:N in a case where M and N are values greater than 1, the method comprising:
an image reading-out step of obtaining first image signals obtained from the plurality of first light receiving sensors and second image signals obtained from the plurality of second light receiving sensors;
an image generating step of generating a first image from the first image signals and generating a second image from the second image signals;
a first light shielding control step of controlling entering or shielding of the second incidence rays for the directional sensor; and
a dynamic range enlarging step of obtaining the first image signals and the second image signals in a state in which the second incidence rays are shielded, and generating a third image having a dynamic range which is equal to or less than M times a dynamic range of the first image.

20. A non-transitory computer recording medium storing a program causing an imaging device to perform the imaging method according to claim 19.

* * * * *